US012810168B2

(12) United States Patent
Jaderberg et al.

(10) Patent No.: US 12,810,168 B2

(45) Date of Patent: Nov. 24, 2026

(54) TRAINING AGENT NEURAL NETWORKS THROUGH OPEN-ENDED LEARNING

(71) Applicant: GDM Holding LLC, Mountain View, CA (US)

(72) Inventors: Maxwell Elliot Jaderberg, London (GB); Wojciech Czarnecki, London (GB)

(73) Assignee: GDM Holding LLC, Mountain View, CA (US)

(*) Notice: Subject to any disclaimer, the term of this patent is extended or adjusted under 35 U.S.C. 154(b) by 395 days.

(21) Appl. No.: 18/577,484

(22) PCT Filed: Jul. 27, 2022

(86) PCT No.: PCT/EP2022/071137

§ 371 (c)(1),
(2) Date: Jan. 8, 2024

(87) PCT Pub. No.: WO2023/006848

PCT Pub. Date: Feb. 2, 2023

(65) Prior Publication Data

US 2024/0330701 A1 Oct. 3, 2024

Related U.S. Application Data

(60) Provisional application No. 63/226,124, filed on Jul. 27, 2021.

(51) Int. Cl.

*G06N 20/00* (2019.01)
*G06N 3/092* (2023.01)
*G06N 3/0985* (2023.01)

(52) U.S. Cl.

CPC .......... *G06N 3/092* (2023.01); *G06N 3/0985* (2023.01)

(58) Field of Classification Search

CPC .... G06N 3/092; G06N 3/0985; G06N 3/0442; G06N 3/045; G06N 3/086; G06N 3/006; G06N 3/044; G06N 3/0455

See application file for complete search history.

(56) References Cited

U.S. PATENT DOCUMENTS

2016/0292568 A1 10/2016 Schaul et al.
2020/0034661 A1 1/2020 Kim et al.

(Continued)

FOREIGN PATENT DOCUMENTS

CN 110730970 A * 1/2020 ............ G06N 3/008
CN 111160511 A * 5/2020 ............ G06N 3/045

(Continued)

OTHER PUBLICATIONS

Akkaya et al., "Solving Rubik's cube with a robot hand," CoRR, Oct. 16, 2019, arxiv.org/abs/1910.07113, 51 pages.

(Continued)

*Primary Examiner* — Hassan Mrabi
(74) *Attorney, Agent, or Firm* — Fish & Richardson P.C.

(57) ABSTRACT

Methods, systems, and apparatus, including computer programs encoded on computer storage media, for raining an agent neural network for use in controlling an agent to perform a plurality of tasks. One of the methods includes maintaining population data specifying a population of one or more candidate agent neural networks; and training each candidate agent neural network on a respective set of one or more tasks to update the parameter values of the parameters of the candidate agent neural networks in the population data, the training comprising, for each candidate agent neural network: obtaining data identifying a candidate task; obtaining data specifying a control policy for the candidate task; determining whether to train the candidate agent neural network on the candidate task; and in response to determining to train the candidate agent neural network on the (Continued)

candidate task, training the candidate agent neural network on the candidate task.

20 Claims, 8 Drawing Sheets

(56) References Cited

U.S. PATENT DOCUMENTS

| | | | | |
|---|---|---|---|---|
| 2021/0004676 | A1 | 1/2021 | Elliot et al. | |
| 2021/0086353 | A1 | 3/2021 | Shah et al. | |
| 2023/0368037 | A1* | 11/2023 | Huang | G06N 3/0499 |
| 2024/0185084 | A1* | 6/2024 | Abdolmaleki | G06N 3/084 |
| 2026/0127494 | A1* | 5/2026 | Cella | G06N 20/00 |

FOREIGN PATENT DOCUMENTS

| | | | | | |
|---|---|---|---|---|---|
| CN | 111602144 | A | * | 8/2020 | G06N 3/08 |
| CN | 112990196 | B | * | 10/2023 | G06V 20/63 |
| JP | 2020034994 | A | | 3/2020 | |
| WO | WO 2019/101836 | | | 5/2019 | |
| WO | WO 2020/099672 | | | 5/2020 | |
| WO | WO-2021156441 | A1 | * | 8/2021 | G06N 3/098 |
| WO | WO-2021156517 | A1 | * | 8/2021 | G06N 3/045 |
| WO | WO-2021245286 | A1 | * | 12/2021 | G06N 3/045 |

OTHER PUBLICATIONS

Alain et al., "Understanding intermediate layers using linear classifier probes," International Conference on Learning Representations, Nov. 22, 2018, 13 pages.
Andrychowicz et al., "Hindsight experience replay," 31st Conference on Neural Information Processing Systems, 2017, 15 pages.
Arthur et al., "K-means++: The advantages of careful seeding," Proceedings of the Eighteenth Annual ACM-SIAM Symposium on Discrete Algorithms, 2007, 9 pages.
Bahdanau et al., "Neural machine translation by jointly learning to align and translate," International Conference on Learning Representations, May 7-9, 2015, 15 pages.
Baker et al., "Emergent tool use from multi-agent autocurricula," International Conference on Learning Representations, Feb. 11, 2020, 28 pages.
Balduzzi et al., "Open-ended learning in symmetric zero-sum games," International Conference on Machine Learning, pp. 434-443.
Balduzzi et al., "Re-evaluating Evaluation," Advances in Neural Information Processing Systems 31, 2018, 12 pages.
Battaglia et al., "Relational inductive biases, deep learning, and graph networks," CoRR, Jun. 4, 2018, arXiv:1806.01261, 37 pages.
Beattie et al., "DeepMind Lab," CoRR, Dec. 12, 2016, arXiv:1612.03801, 11 pages.
Berner et al., "Dota 2 with large scale deep reinforcement learning," CoRR, Dec. 13, 2019, arXiv preprint arXiv:1912.06680, 66 pages.
blog.otoro.net [online], "Generating Abstract Patterns with TensorFlow," Mar. 25, 2016, retrieved on May 24, 2024, retrieved from URL<https://blog.otoro.net/2016/03/25/generating-abstract-patterns-with-tensorflow/>, 18 pages.
Borkar et al., "Risk-Constrained Markov decision processes," IEEE Transactions on Automatic Control, Sep. 2014, 59(9):2574-2579.
Bowling, "Convergence problems of general-sum multiagent reinforcement learning," International Conference on Machine Learning, 2000, 6 pages.
Brant et al., "Minimal criterion coevolution: a new approach to open-ended search," Proceedings of the Genetic and Evolutionary Computation Conference, 2017, pp. 67-74.
Campero et al., "Learning with amigo: Adversarially motivated intrinsic goals," International Conference on Learning Representations, Feb. 23, 2021, 18 pages.
Clune, "AI-GAs: AI-generating algorithms, an alternate paradigm for producing general artificial intelligence," CoRR, May 27, 2019, arXiv:1905.10985, 34 pages.
Colas et al., "Curious: intrinsically motivated modular multi-goal reinforcement learning," Proceedings of the 36th International Conference on Machine Learning, 2019, 97:1331-1340.
Colas et al., "Language-conditioned goal generation: a new approach to language grounding for RL," CoRR, Jun. 12, 2020, arXiv:2006.07043, 8 pages.
Connor, "Friends and grandmothers," Nature, Jun. 23, 2005, 435(7045):1036-1037.
Czarnecki et al., "Distilling policy distillation," Proceedings of the Twenty-Second International Conference on Artificial Intelligence and Statistics, 2019, 89:1331-1340.
Czarnecki et al., "Real world games look like spinning tops," Advances in Neural Information Processing Systems 33, pp. 17443-17454.
Delage et al., "Percentile optimization for Markov decision processes with parameter uncertainty," Oper. Res., Aug. 17, 2009, 58(1):203-213.
Dennis et al., "Emergent complexity and zero-shot transfer via unsupervised environment design," Advances in Neural Information Processing Systems 34, 2020, 13 pages.
Distill.pub [online], "Multimodal Neurons in Artificial Neural Networks," Mar. 4, 2021, retrieved on May 21, 2024, retrieved from URL<https://distill.pub/2021/multimodal-neurons/>, 29 pages.
Fang et al., "Curriculum-guided hindsight experience replay," Advances in Neural Information Processing Systems 32, 2019, 12 pages.
Filar et al., "Percentile performance criteria for limiting average Markov decision processes," IEEE Transactions on Automatic Control, Jan. 1995, 40(1):2-10.
Florensa et al., "Automatic goal generation for reinforcement learning agents," Proceedings of the 35 th International Conference on Machine Learning, 2018, 14 pages.
Furlanello et al., "Born again neural networks," Proceedings of the 35th International Conference on Machine Learning, 2018, 80:1607-1616.
Garnelo et al., "Pick your battles: Interaction graphs as population-level objectives for strategic diversity," Proceedings of the 20th International Conference on Autonomous Agents and MultiAgent Systems, May 2021, pp. 1501-1503.
Github.com [online], "mxgmn/WaveFunctionCollapse," Jul. 21, 2022, retrieved on May 24, 2024, retrieved from URL<https://github.com/mxgmn/WaveFunctionCollapse/releases/>, 18 pages.
Github.com [online], "Sonnet," Sep. 6, 2019, retrieved on Aug. 30, 2024, retrieved from URL<https://github.com/google-deepmind/sonnet/>, 8 pages.
Goodfellow et al., "Generative adversarial nets," Advances in Neural Information Processing Systems 27, 2014, 9 pages.
Graves et al., "Automated curriculum learning for neural networks," Proceedings of the 34th International Conference on Machine Learning, 2017, 70:1311-1320.
Grbic et al., "Evocraft: A new challenge for open-endedness," CoRR, Dec. 8, 2020, arxiv.org/abs/2012.04751, 17 pages.
Hanley et al., "The meaning and use of the area under a receiver operating characteristic (ROC) curve," Radiology, Apr. 1, 1982, 143(1):29-36.
Hasselt et al., "Learning values across many orders of magnitude," Proceedings of the 30th International Conference on Neural Information Processing Systems, Dec. 5, 2024, pp. 4294-4302.
He et al., "Deep residual learning for image recognition," Proceedings of the IEEE Conference on Computer Vision and Pattern Recognition (CVPR), 2016, pp. 770-778.
Heinrich et al., "Deep reinforcement learning from self-play in imperfect-information games," CoRR, Mar. 3, 2016, arXiv:1603.01121, 10 pages.
Hessel et al., "Multi-task deep reinforcement learning with popart," Proceedings of the AAAI Conference on Artificial Intelligence, Jul. 17, 2019, 33:3796-3803.
Hochreiter et al., "Long short-term memory," Neural computation, Nov. 15, 1997. 9(8):1735-1780.
International Preliminary Report on Patentability in International Appln. No. PCT/EP2022/071137, dated Jan. 18, 2024, 13 pages.
International Search Report and Written Opinion in International Appln. No. PCT/EP2022/071137, dated Nov. 28, 2022, 15 pages.

(56) References Cited

OTHER PUBLICATIONS

Jabri et al., "Unsupervised curricula for visual meta-reinforcement learning," 33rd Conference on Neural Information Processing Systems, 2019, 13 pages.
Jaderberg et al., "Human-level performance in 3D multiplayer games with population-based reinforcement learning," Science, May 31, 2019, 364(6443):859-865.
Jaderberg et al., "Population based training of neural networks," CoRR, Nov. 27, 2017, arXiv:1711.09846, 21 pages.
Jaderberg et al., "Reinforcement learning with unsupervised auxiliary tasks," International Conference on Learning Representations, Jul. 21, 2022, 17 pages.
Jiang et al., "Prioritized level replay," CoRR, Oct. 8, 2020, arxiv.org/abs/2010.03934, 26 pages.
Justesen et al., "Illuminating generalization in deep reinforcement learning through procedural level generation," NeurIPS 2018 Workshop on Deep Reinforcement Learning, Jul. 2018, 10 pages.
Kanitscheider et al., "Multi-task curriculum learning in a complex, visual, hard-exploration domain: Minecraft," CoRR, Jun. 28, arxiv.org/abs/2106.14876, 17 pages.
Kaplan et al., "In search of the neural circuits of intrinsic motivation," Frontiers in Neuroscience, Oct. 15, 2007, 1:17.
Khalifa et al., "PCGRL: Procedural content generation via reinforcement learning," CoRR, Jan. 24, 2020, arxiv.org/abs/2001.09212, 7 pages.
Kingma et al., "Auto-encoding variational bayes," CoRR, Dec. 2013, arxiv.org/abs/1312.6114, 14 pages.
Kohonen, "Self-organized formation of topologically correct feature maps," Biological Cybernetics, Jan. 1982, 3(1):59-69.
Lanctot et al., "A unified gametheoretic approach to multiagent reinforcement learning," Proceedings of the 31st International Conference on Neural Information Processing Systems, Dec. 2017, pp. 4193-4206.
Leibo et al., "Autocurricula and the emergence of innovation from social interaction; A manifesto for multi-agent intelligence research," CoRR, Mar. 2, 2019, arxiv.org/abs/1903.00742, 16 pages.
Leibo et al., "Multi-agent reinforcement learning in sequential social dilemmas," Proceedings of the 16th Conference on Autonomous Agents and MultiAgent Systems, AAMAS 2017, May 8-12, 2017, pp. 464-473.
Lloyd, "Least squares quantization in PCM," IEEE Trans. Inf. Theor., Mar. 1982, 28(2):129-137.
Lowe et al., "Multi-agent actor-critic for mixed cooperative-competitive environments," Proceedings of the 31st International Conference on Neural Information Processing Systems, Dec. 2017, pp. 6382-6393.
Mahajan et al., "MAVEN: Multi-agent variational exploration," Advances in Neural Information Processing Systems 32, 2019, pp. 7613-7624.
Marris et al., "Multi-agent training beyond zero-sum with correlated equilibrium meta-solvers," Proceedings of the 38th International Conference on Machine Learning, Jul. 18-24, 2021, 139:7480-7491.
Matiisen et al., "Teacher-student curriculum learning, " IEEE Transactions on Neural Networks and Learning Systems, Sep. 2020, 31(9):3732-3740.
McMahan et al., "Planning in the presence of cost functions controlled by an adversary," Proceedings of the 20th International Conference on Machine Learning (ICML-03), 2003, pp. 536-543.
Mirhoseini et al., "A graph placement methodology for fast chip design," Nature, Jun. 10, 2021, 594(7862):207-212.
Mnih et al., "Human-level control through deep reinforcement learning," Nature, Feb. 26, 2015, 518(7540):529-533.
Nair et al., "Visual reinforcement learning with imagined goals," 32nd Conference on Neural Information Processing Systems, 2018, 10 pages.
Nash et al., "Equilibrium points in n-person games," Proceedings of the national academy of sciences, Jan. 1950, 36(1):48-49.
Nielsen, "Closed-form information-theoretic divergences for statistical mixtures," Proceedings of the 21st International Conference on Pattern Recognition (ICPR2012), Nov. 11-15, 2012, pp. 1723-1726.
Penrose, "A generalized inverse for matrices," Mathematical proceedings of the Cambridge Philosophical Society, Jul. 1955, 51(3):406-413.
Plappert et al., "Asymmetric self-play for automatic goal discovery in robotic manipulation," CoRR, Jan. 13, 2021, arxiv.org/abs/2101.04882, 21 pages.
Pong et al., "Skew-fit: State-covering self-supervised reinforcement learning," Proceedings of the 37th International Conference on Machine Learning, Jul. 2020, 721:7783-7792.
Portelas et al., "Automatic curriculum learning for Deep RL: A short survey," Proceedings of the Twenty-Ninth International Joint Conference on Artificial Intelligence, Jan. 2021, pp. 4819-4825.
Portelas et al., "Teacher algorithms for curriculum learning of deep RL in continuously parameterized environments," Proceedings of the Conference on Robot Learning, 2020, 100:835-853.
Prashanth et al., "Actor-critic algorithms for risk-sensitive MDPs," Proceedings of the 26th International Conference on Neural Information Processing Systems, Dec. 2013, 1:252-260.
Quiroga et al., "Invariant visual representation by single neurons in the human brain," Nature, Jun. 23, 2005, 435(7045):1102-1107.
Racanière et al., "Automated curriculum generation through setter-solver interactions," International Conference on Learning Representations, Dec. 19, 2019, 18 pages.
Rusu et al., "Progressive neural networks," CoRR, Jun. 15, 2016, arXiv:1606.04671, 14 pages.
Schaul et al., "Prioritized experience replay," International Conference on Learning Representations, Nov. 19, 2016, 23 pages.
Schaul et al., "Universal value function approximators," Proceedings of the 32nd International Conference on Machine Learning, 2015, 37:1312-1320.
Schmidhuber, "Formal theory of creativity, fun, and intrinsic motivation (1990-2010)," IEEE Transactions on Autonomous Mental Development, Sep. 2010, 2(3):230-247.
Schmidhuber, "Powerplay: Training an increasingly general problem solver by continually searching for the simplest still unsolvable problem," Frontiers in psychology, Jun. 7, 2013, 4:313.
Schmitt et al., "Kickstarting deep reinforcement learning," CoRR, Mar. 10, 2018, arXiv:1803.03835, 9 pages.
Schölkopf et al., "Nonlinear component analysis as a kernel eigenvalue problem," Neural computation, Jul. 1, 1998, 10(5):1299-1319.
Scholkopf, "The kernel trick for distances," Advances in neural information processing systems 13, 2000, pp. 7 pages.
Schrum et al., "CPPN2GAN: Combining compositional pattern producing networks and gans for large-scale pattern generation," Proceedings of the 2020 Genetic and Evolutionary Computation Conference, Jun. 26, 2020, p. 139-147.
Schwarz et al., "Progress & compress: A scalable framework for continual learning," Proceedings of the 35th International Conference on Machine Learning, 2018, 80:4528-4537.
Sessa et al., "Contextual games: Multi-agent learning with side information," Advances in Neural Information Processing Systems 33, 2020, 11 pages.
Shoham et al., "If multi-agent learning is the answer, what is the question?," Artificial intelligence, May 2007, 171(7):365-377.
Silver et al., "Mastering the game of Go with deep neural networks and tree search," Nature, Jan. 28, 2016, 529(7587):484-489.
Silver et al., "Mastering the game of Go without human knowledge," Nature, Oct. 19, 2017, 550(7676):354-359.
Song et al., "V-MPO: on-policy maximum a posteriori policy optimization for discrete and continuous control," International Conference on Learning Representations, Dec. 19, 2019, 22 pages.
Stanley et al., "Evolving neural networks through augmenting topologies," Evolutionary Computation, Jun. 2002, 10(2):99-127.
Stanley, "Compositional pattern producing networks: A novel abstraction of development," Genetic Programming and Evolvable Machines, May 10, 2007, 8(2):131-162.
Sukhbaatar et al., "Intrinsic motivation and automatic curricula via asymmetric self-play," International Conference on Learning Representations, Feb. 15, 2018, 16 pages.
Tamar et al., "Policy gradients with variance related risk criteria," Proceedings of the 29th International Conference on Machine Learning, Jun. 26, 2012, pp. 1651-1658.

(56) References Cited

OTHER PUBLICATIONS

Tasse et al., "A boolean task algebra for reinforcement learning," Advances in Neural Information Processing Systems 33, 2020, pp. 9497-9507.
Teh et al., "Distral: Robust multitask reinforcement learning," Advances in Neural Information Processing Systems 30, 2017, 11 pages.
Todorov, "Compositionality of optimal control laws," Advances in neural information processing systems, 2009, 22:1856-1864.
Togelius et al., "An experiment in automatic game design," 2008 IEEE Symposium on Computational Intelligence and Games, Dec. 15-18, 2008, pp. 111-118.
Van der Maaten et al., "Visualizing data using t-SNE," Journal of machine learning research, Nov. 1, 2008, 9(11):2579-2605.
Van Niekerk et al., "Composing value functions in reinforcement learning," Proceedings of the 36th International Conference on Machine Learning, 2019, 97:6401-6409.
Vezhnevets et al., "Options as responses: Grounding behavioral hierarchies in multi-agent reinforcement learning," Proceedings of the 37th International Conference on Machine Learning, 2020, 119:9733-9742.
Vinyals et al., "Grandmaster level in starcraft II using multi-agent reinforcement learning," Nature, 2019, 575(7782):350-354.
Volz et al., "Evolving mario levels in the latent space of a deep convolutional generative adversarial network," Proceedings of the Genetic and Evolutionary Computation Conference, Jul. 2, 2018, pp. 221-228.
Wang et al., "Enhanced POET: open-ended reinforcement learning through unbounded invention of learning challenges and their solutions," Proceedings of the 37th International Conference on Machine Learning, Jul. 13-18, 2020, 119:9940-9951.
Wang et al., "POET: open-ended coevolution of environments and their optimized solutions," Proceedings of the Genetic and Evolutionary Computation Conference, Jul. 13, 2019, pp. 142-151.
Ward et al., "Using Unity to help solve intelligence," CoRR, Nov. 18, 2020, arxiv.org/abs/2011.09294, 15 pages.
Warde-Farley et al., "Unsupervised control through non-parametric discriminative rewards," International Conference on Learning Representations, Dec. 20, 2018, 17 pages.
Zhang et al., "Automatic curriculum learning through value disagreement," Advances in Neural Information Processing Systems 33, Dec. 6-12, 2020.
Zhang et al., "Deep mutual learning, " Proceedings of the IEEE Conference on Computer Vision and Pattern Recognition (CVPR), 2018, pp. 4320-4328.
Zhou et al., "Efficient Online Hyperparameter Adaptation for Deep Reinforcement Learning," Theory and Applications of Models of Computation, Mar. 30, 2019, 11454:141-155.
Office Action in Japanese Appln. No. 2024-505148, dated Nov. 5, 2024, 8 pages (with English translation).
Notice of Allowance in Japanese Appln. No. 2024-505148, mailed on Jun. 17, 2025, 5 pages (with English translation).
Notice of Allowance in Japanese Appln. No. 2025-119011, mailed on Jun. 16, 2026, 5 pages (with English translation).
Office Action in Korean Appln. No. 10-2024-7004008, mailed on Apr. 29, 2026, 4 pages (with English translation).

* cited by examiner

TRAINING AGENT NEURAL NETWORKS THROUGH OPEN-ENDED LEARNING

CROSS-REFERENCE TO RELATED APPLICATIONS

This application is a National Stage Application under 35 U.S.C. § 371 and claims the benefit of International Application No. PCT/EP2022/071137, filed Jul. 27, 2022, which claims priority to U.S. Provisional Application No. 63/226,124, filed on Jul. 27, 2021. The disclosure of the prior application is considered part of and is incorporated by reference in the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations that trains an agent neural network that is used to select actions to be performed by an agent interacting with an environment. In particular, the system trains the agent neural network so that the agent neural network can be used to control the agent to perform any of multiple tasks. Each task can include one or more of, e.g., navigating to a specified location in the environment, identifying a specific object in the environment, manipulating the specific object in a specified way, and so on.

In one aspect there is described a computer-implemented method for training an agent neural network for use in controlling an agent to perform a plurality of tasks. The method comprises maintaining population data specifying a population of one or more candidate agent neural networks, the population data specifying, for each candidate agent neural network in the population, (i) respective parameter values of the parameters of the candidate agent neural network and (ii) respective hyperparameter values for training the candidate agent neural network. The method involves training each candidate agent neural network on a respective set of one or more tasks, in general multiple tasks, to update the parameter values of the parameters of the candidate agent neural networks in the population data. In implementations the training comprises, for each candidate agent neural network: obtaining data identifying a candidate task (e.g. one of the multiple tasks) for training the candidate agent neural network: obtaining data specifying a control policy for the candidate task; and determining whether (or not) to train the candidate agent neural network on the candidate task based on (i) a performance of the candidate agent neural network on the candidate task, (ii) a performance of the control policy for the candidate task on the candidate task and (iii) one or more of the hyperparameter values for the candidate agent neural network. In response to determining to train the candidate agent neural network on the candidate task, the method includes training the candidate agent neural network on the candidate task to update the parameter values of the parameters of the agent neural network, e.g. using reinforcement learning. The training may be performed repeatedly, each time obtaining data identifying a candidate task i.e. using one of the multiple tasks as the candidate task.

In implementations of such a method the training tasks consumed by the agent(s) are dynamically generated in response to the performance of the agent(s). An effect is that the task distributions are changed throughout the training, and may themselves be optimized to improve the performance of the agent(s). More specifically, whether (or not) to train the candidate agent neural network is determined based on a combination of three factors, as listed above. For example in general the agent should only be trained on a task if the performance is (significantly) better than the control policy, so that the agent performs meaningful actions, i.e. ones that affect the return. The performance of an agent may generally be determined e.g. from the return(s) from the task. The control policy may be any action selection policy (for controlling the agent to perform the candidate task), e.g. a uniform random action policy or an agent's past policy.

The trained agent neural network may be used for use in controlling an agent, in one or more environments, to perform the plurality of tasks. The environment(s) may be real-world environment(s) but some or all of the training may be in a simulation of the real-world environment(s). In some implementations, in particular where some or all of the training, is in simulation, the "proposal" tasks for training the candidate agent neural network(s) are generated procedurally i.e. automatically based on task parameters, and these may then be used for determining whether or not to train a candidate agent neural network.

The above described method may be used to obtain a population comprising one or more candidate agent neural networks. When the population comprises more than one candidate agent neural network, a population of multiple candidate agent neural networks is trained. Then one or more may be selected as the trained agent neural network. In a population of multiple candidate agent neural networks these may, but need not, have the same architecture as one another: in general they have different respective parameter values, e.g. weights, and may have different respective hyperparameter values.

In some implementations the population of candidate agent neural networks is used for population based training. That is the population of candidate agent neural networks is trained and a fitness measure is determined for each of the agents, e.g. to compare two (or more) of the agents. This may be done, e.g. by evaluating each of the agents using a fitness function: there are many suitable fitness measures: in general fitness may be determined from the return(s) from the task.

As described above each candidate agent neural network is controlled by respective hyperparameter values. The fitness measure may be used modify the population of candidate agent neural networks with the aim of improving the performance of the population, in particular by adjusting the hyperparameter values for one or more of the candidate agent neural networks. The adjusting may be performed in many ways. As one example the hyperparameter values could be randomly perturbed.

As another example if it is determined that a fitness measure for a first candidate agent neural network (over a plurality of tasks) Pareto dominates that of a second candidate agent neural network (over the plurality of tasks) the hyperparameter values for the second candidate agent neural network may be adjusted to be equal to a mutated (modified) version of the hyperparameter values for the first candidate agent neural network. Pareto domination may be considered achieved if the fitness measure is at least as good over the plurality of tasks and better for at least one of the tasks. The tasks may be the candidate tasks or other, e.g. validation, tasks.

In some implementations a less preferred candidate agent neural network, i.e. one with a lesser fitness measure (e.g. when comparing two agents), may set its respective parameter values (e.g. weights), and optionally also its hyperparameter values, to the respective parameter values, and optionally hyperparameter values, for another candidate agent neural network e.g. one with a greater fitness measure (e.g. when comparing two agents).

As mentioned above, the fitness or performance of an agent may in general be determined from the return(s) from a task. However when there are many candidate tasks the returns can vary over a wide range. Thus in some implementations computing a fitness (or performance) measure for a task comprises determining a respective normalized percentile metric, e.g. by determining a kth, e.g. $50^{th}$, percentile score achieved by the agent on the task, where the score is normalized using (divided by) a normalized constant that is the score achieved by a mixture or set of one or more agents (candidate agent neural networks) that achieve the best score on the task. Here the score is based on the reward(s) or return(s) achieved by the agent for the task. This approach avoids the need to compare performance with, e.g. an optimal policy for the task, useful as determining such as optimal policy may not be straightforward.

A candidate agent neural network may be trained on a candidate task to optimize an expected return from the task while distilling from a best performing candidate agent neural network in the population, e.g. as determined at the end of a preceding training generation that immediately precedes the current training generation in the sequence. Such training while distilling may comprise training using a distillation loss that encourages an action selection output of the candidate agent neural network being trained towards the action selection output of the best performing candidate agent neural network, e.g. a loss based on a difference between these outputs.

The training may involve a self-reward play objective i.e. an objective in which a candidate agent neural network is trained, sequentially, to achieve a goal g and to achieve not(g) (where not(g) is the negation of the goal). This can encourage exploration: it can be seen as the agent is competing against itself. A goal may be represented as a set of options (disjunctions) over respective sets of predicates e.g. representing one or more necessary conditions for each option. A goal may, but need not be, represented as natural language.

In general the agent neural network (and each of the candidate agent neural networks) is configured for use in controlling an agent, in one or more environments, to perform the plurality of tasks. Thus in general the agent neural network (and each of the candidate agent neural networks) is configured to receive and process an observation characterizing a current state of the environment, and in some implementations may also be configured to receive and process data identifying the (particular) task to be performed, such as goal data representing a goal to be satisfied in order to perform the task in the environment (alternatively, for example, the task may be inferred from the environment).

In general the agent neural network (and each of the candidate agent neural networks) is configured to generate an action selection output that characterizes an action to be performed by the agent in response to the observation in order to perform one or more of the tasks. In implementations the trained agent neural network is used to select actions to be performed by the agent in a real-world environment, and the selected actions relate to actions to be performed by the agent in the real-world environment (and the observations relate to observations of the real-world environment). As one example the agent may comprise a mechanical agent such as a robot or autonomous or semi-autonomous vehicle: other examples of agents are given later.

The subject matter described in this specification can be implemented in particular implementations so as to realize one or more of the following advantages.

The described techniques can implement an open-ended reinforcement learning training process, during which the training task distributions and training objectives are dynamically adapted in a way such that multiple instances of an agent neural network rarely stops learning, to continuously and effectively train the network instances to cause an agent that is being controlled by one or more of the trained network instances to achieve robust and generally competent performance across a massive space of different tasks and environments. The described techniques for training the agent neural network are universally applicable for any type of complex environment in which the agent may be deployed to perform any type of technically challenging task.

Using the described techniques thus results in a generally capable agent neural network that can outperform not only the state-of-the-art but also the human-level performance on a range of agent control tasks while additionally being generalizable and easily adaptable, e.g. by fine tuning, to new tasks, including novel tasks that are naturally distinct from existing tasks on which the network may have been trained. In addition to achieving improved agent performance, by training a population of agent neural network instances across massively multiple tasks, e.g. an infinitely multi-task continuum, the training process also consumes fewer computational resources, e.g., memory and processing power, than conventional approaches that require training one neural network model from scratch for each single new task or new environment.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
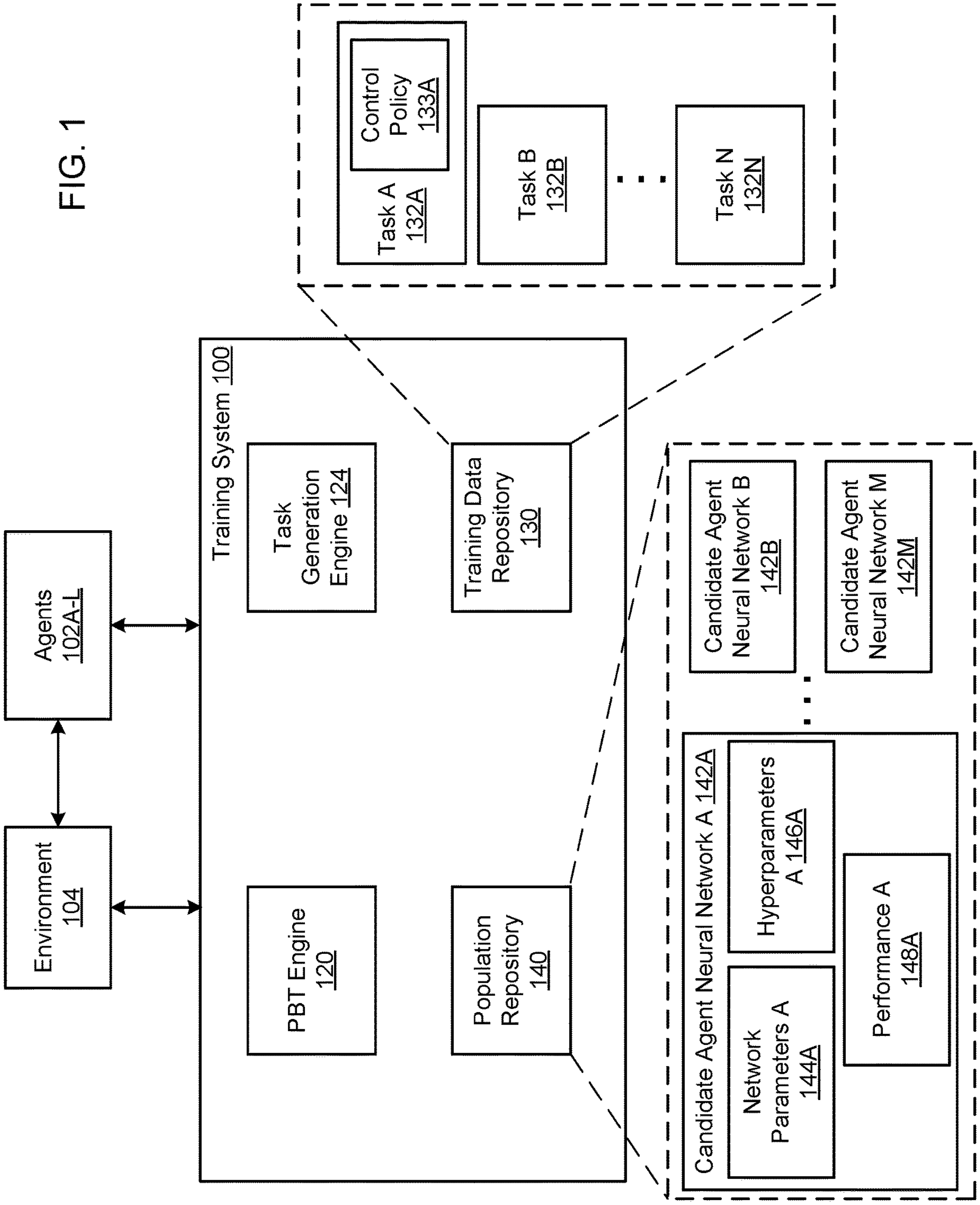
FIG. 1 shows an example training system.

FIG. 1 shows an example training system 100. The training system 100 is an example of a system implemented as computer programs on one or more computers in one or more locations, in which the systems, components, and techniques described below can be implemented.

The training system 100 is a system that implements an open-ended reinforcement learning training process to train multiple instances of an agent neural network that can each be used to select actions to be performed by an agent, e.g., agent 102A, in an environment 104 in order to control the agent to perform a range of machine learning tasks. In some cases, the machine learning task is a single-agent task that can be performed by the agent itself while in other cases, the machine learning task is a multi-agent task that requires the agent to interact, e.g., compete or coordinate, with one or more other reinforcement learning agents, e.g., agents 102B-L, in the environment 104. That is, the training system 100 obtains (i.e., generates or receives) observations, with each observation characterizing a respective state of the environment 104, and, in response to each observation, selects an action from a predetermined set of actions to be performed by the reinforcement learning agent 102A in response to the observation. In response to some or all of the actions performed by the agent 102A, the training system 100 obtains a reward. Each reward is a numeric value received from the environment 104 as a consequence of the agent 102A performing an action, in particular, the reward will be different depending on the state that the environment 104 transitions into as a result of the agent 102A performing the action. In some cases, the predetermined set of actions can define a discrete action space while in other cases, the predetermined set of actions can alternatively define a continuous action space, i.e., all of the action values in an individual action are selected from a continuous range of possible values, or can further alternatively define a hybrid action space, i.e., one or more of the action values in an individual action are selected from a continuous range of possible values.

In particular, by implementing the described open-ended reinforcement learning training process, it becomes possible to train a single and yet generally capable agent neural network that can be used to control the agent to achieve or even exceed not only the state-of-the-art but also the human-level performance across thousands or millions of tasks in different environments.

In some implementations, the environment is a real-world environment, the agent is a mechanical agent interacting with the real-world environment, e.g., a robot or an autonomous or semi-autonomous land, air, or sea vehicle operating in or navigating through the environment, and the actions are actions taken by the mechanical agent in the real-world environment to perform the task. For example, the agent may be a robot interacting with the environment to accomplish a specific task, e.g., to locate an object of interest in the environment or to move an object of interest to a specified location in the environment or to navigate to a specified destination in the environment.

In these implementations, the observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control signals to control the robot or other mechanical agent, e.g., torques for the joints of the robot or higher-level control commands, or the autonomous or semi-autonomous land, air, sea vehicle, e.g., torques to the control surface or other control elements e.g. steering control elements of the vehicle, or higher-level control commands. The control signals can include for example, position, velocity, or force/torque/acceleration data for one or more joints of a robot or parts of another mechanical agent. The control signals may also or instead include electronic control data such as motor control data, or more generally data for controlling one or more electronic devices within the environment the control of which has an effect on the observed state of the environment. For example in the case of an autonomous or semi-autonomous land or air or sea vehicle the control signals may define actions to control navigation e.g. steering, and movement e.g., braking and/or acceleration of the vehicle.

In some implementations the environment is a simulation of the above-described real-world environment, and the agent is implemented as one or more computers interacting with the simulated environment. For example the simulated environment may be a simulation of a robot or vehicle and the reinforcement learning system may be trained on the simulation and then, once trained, used in the real-world.

In some implementations the environment is a real-world manufacturing environment for manufacturing a product, such as a chemical, biological, or mechanical product, or a food product. As used herein a "manufacturing" a product also includes refining a starting material to create a product, or treating a starting material e.g. to remove pollutants, to generate a cleaned or recycled product. The manufacturing plant may comprise a plurality of manufacturing units such as vessels for chemical or biological substances, or machines, e.g. robots, for processing solid or other materials. The manufacturing units are configured such that an intermediate version or component of the product is moveable between the manufacturing units during manufacture of the product, e.g. via pipes or mechanical conveyance. As used herein manufacture of a product also includes manufacture of a food product by a kitchen robot.

The agent may comprise an electronic agent configured to control a manufacturing unit, or a machine such as a robot, that operates to manufacture the product. That is, the agent may comprise a control system configured to control the manufacture of the chemical, biological, or mechanical product. For example the control system may be configured to control one or more of the manufacturing units or machines or to control movement of an intermediate version or component of the product between the manufacturing units or machines.

As one example, a task performed by the agent may comprise a task to manufacture the product or an intermediate version or component thereof. As another example, a task performed by the agent may comprise a task to control, e.g. minimize, use of a resource such as a task to control electrical power consumption, or water consumption, or the consumption of any material or consumable used in the manufacturing process.

The actions may comprise control actions to control the use of a machine or a manufacturing unit for processing a solid or liquid material to manufacture the product, or an intermediate or component thereof, or to control movement of an intermediate version or component of the product within the manufacturing environment e.g. between the manufacturing units or machines. In general the actions may be any actions that have an effect on the observed state of the environment, e.g. actions configured to adjust any of the sensed parameters described below. These may include actions to adjust the physical or chemical conditions of a manufacturing unit, or actions to control the movement of mechanical parts of a machine or joints of a robot. The actions may include actions imposing operating conditions on a manufacturing unit or machine, or actions that result in changes to settings to adjust, control, or switch on or off the operation of a manufacturing unit or machine.

The rewards or return may relate to a metric of performance of the task. For example in the case of a task that is to manufacture a product the metric may comprise a metric of a quantity of the product that is manufactured, a quality of the product, a speed of production of the product, or to a physical cost of performing the manufacturing task, e.g. a metric of a quantity of energy, materials, or other resources, used to perform the task. In the case of a task that is to control use a resource the matric may comprise any metric of usage of the resource.

In general observations of a state of the environment may comprise any electronic signals representing the functioning of electronic and/or mechanical items of equipment. For example a representation of the state of the environment may be derived from observations made by sensors sensing a state of the manufacturing environment, e.g. sensors sensing a state or configuration of the manufacturing units or machines, or sensors sensing movement of material between the manufacturing units or machines. As some examples such sensors may be configured to sense mechanical movement or force, pressure, temperature: electrical conditions such as current, voltage, frequency, impedance: quantity, level, flow/movement rate or flow/movement path of one or more materials: physical or chemical conditions e.g. a physical state, shape or configuration or a chemical state such as pH: configurations of the units or machines such as the mechanical configuration of a unit or machine, or valve configurations: image or video sensors to capture image or video observations of the manufacturing units or of the machines or movement: or any other appropriate type of sensor. In the case of a machine such as a robot the observations from the sensors may include observations of position, linear or angular velocity, force, torque or acceleration, or pose of one or more parts of the machine, e.g. data characterizing the current state of the machine or robot or of an item held or processed by the machine or robot. The observations may also include, for example, sensed electronic signals such as motor current or a temperature signal, or image or video data for example from a camera or a LIDAR sensor. Sensors such as these may be part of or located separately from the agent in the environment.

In some implementations the environment is the real-world environment of a service facility comprising a plurality of items of electronic equipment, such as a server farm or data center, for example a telecommunications data center, or a computer data center for storing or processing data, or any service facility. The service facility may also include ancillary control equipment that controls an operating environment of the items of equipment, for example environmental control equipment such as temperature control e.g. cooling equipment, or air flow control or air conditioning equipment. The task may comprise a task to control, e.g. minimize, use of a resource, such as a task to control electrical power consumption, or water consumption. The agent may comprise an electronic agent configured to control operation of the items of equipment, or to control operation of the ancillary, e.g. environmental, control equipment.

In general the actions may be any actions that have an effect on the observed state of the environment, e.g. actions configured to adjust any of the sensed parameters described below: These may include actions to control, or to impose operating conditions on, the items of equipment or the ancillary control equipment, e.g. actions that result in changes to settings to adjust, control, or switch on or off the operation of an item of equipment or an item of ancillary control equipment.

In general observations of a state of the environment may comprise any electronic signals representing the functioning of the facility or of equipment in the facility. For example a representation of the state of the environment may be derived from observations made by any sensors sensing a state of a physical environment of the facility or observations made by any sensors sensing a state of one or more of items of equipment or one or more items of ancillary control equipment. These include sensors configured to sense electrical conditions such as current, voltage, power or energy: a temperature of the facility: fluid flow, temperature or pressure within the facility or within a cooling system of the facility: or a physical facility configuration such as whether or not a vent is open.

The rewards or return may relate to a metric of performance of the task. For example in the case of a task to control, e.g. minimize, use of a resource, such as a task to control use of electrical power or water, the metric may comprise any metric of use of the resource.

In some implementations the environment is the real-world environment of a power generation facility e.g. a renewable power generation facility such as a solar farm or wind farm. The task may comprise a control task to control power generated by the facility, e.g. to control the delivery of electrical power to a power distribution grid, e.g. to meet demand or to reduce the risk of a mismatch between elements of the grid, or to maximize power generated by the facility. The agent may comprise an electronic agent configured to control the generation of electrical power by the facility or the coupling of generated electrical power into the grid. The actions may comprise actions to control an electrical or mechanical configuration of an electrical power generator such as the electrical or mechanical configuration of one or more renewable power generating elements e.g. to control a configuration of a wind turbine or of a solar panel or panels or mirror, or the electrical or mechanical configuration of a rotating electrical power generation machine. Mechanical control actions may, for example, comprise actions that control the conversion of an energy input to an electrical energy output, e.g. an efficiency of the conversion or a degree of coupling of the energy input to the electrical energy output. Electrical control actions may, for example, comprise actions that control one or more of a voltage, current, frequency or phase of electrical power generated.

The rewards or return may relate to a metric of performance of the task. For example in the case of a task to control the delivery of electrical power to the power distribution grid the metric may relate to a measure of power transferred, or to a measure of an electrical mismatch between the power generation facility and the grid such as a voltage, current, frequency or phase mismatch, or to a measure of electrical power or energy loss in the power generation facility. In the case of a task to maximize the delivery of electrical power to the power distribution grid the metric may relate to a measure of electrical power or energy transferred to the grid, or to a measure of electrical power or energy loss in the power generation facility.

In general observations of a state of the environment may comprise any electronic signals representing the electrical or mechanical functioning of power generation equipment in the power generation facility. For example a representation of the state of the environment may be derived from observations made by any sensors sensing a physical or electrical state of equipment in the power generation facility that is generating electrical power, or the physical environment of such equipment, or a condition of ancillary equipment supporting power generation equipment. Such sensors may include sensors configured to sense electrical conditions of the equipment such as current, voltage, power or energy: temperature or cooling of the physical environment: fluid flow: or a physical configuration of the equipment; and observations of an electrical condition of the grid e.g. from local or remote sensors. Observations of a state of the environment may also comprise one or more predictions regarding future conditions of operation of the power generation equipment such as predictions of future wind levels or solar irradiance or predictions of a future electrical condition of the grid.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In a similar way the environment may be a drug design environment such that each state is a respective state of a potential pharmachemical drug and the agent is a computer system for determining elements of the pharmachemical drug and/or a synthetic pathway for the pharmachemical drug. The drug/synthesis may be designed based on a reward derived from a target for the drug, for example in simulation. As another example, the agent may be a mechanical agent that performs or controls synthesis of the drug.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

In some cases, the observations may include textual or spoken instructions provided to the agent by a third-party (e.g., an operator of the agent). For example, the agent may be an autonomous vehicle, and a user of the autonomous vehicle may provide textual or spoken instructions to the agent (e.g., to navigate to a particular location).

As another example the environment may be an electrical, mechanical or electro-mechanical design environment, e.g. an environment in which the design of an electrical, mechanical or electro-mechanical entity is simulated. The simulated environment may be a simulation of a real-world environment in which the entity is intended to work. The task may be to design the entity. The observations may comprise observations that characterize the entity, i.e. observations of a mechanical shape or of an electrical, mechanical, or electro-mechanical configuration of the entity, or observations of parameters or properties of the entity. The actions may comprise actions that modify the entity e.g. that modify one or more of the observations. The rewards or return may comprise one or more metric of performance of the design of the entity. For example rewards or return may relate to one or more physical characteristics of the entity such as weight or strength or to one or more electrical characteristics of the entity such as a measure of efficiency at performing a particular function for which the entity is designed. The design process may include outputting the design for manufacture, e.g. in the form of computer executable instructions for manufacturing the entity. The process may include making the entity according to the design. Thus a design an entity may be optimized, e.g. by reinforcement learning, and then the optimized design output for manufacturing the entity, e.g. as computer executable instructions: an entity with the optimized design may then be manufactured.

As previously described the environment may be a simulated environment. Generally in the case of a simulated environment the observations may include simulated versions of one or more of the previously described observations or types of observations and the actions may include simulated versions of one or more of the previously described actions or types of actions. For example the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle. Generally the agent may be implemented as one or more computers interacting with the simulated environment.

The simulated environment may be a simulation of a particular real-world environment and agent. For example, the system may be used to select actions in the simulated environment during training or evaluation of the system and, after training, or evaluation, or both, are complete, may be deployed for controlling a real-world agent in the particular real-world environment that was the subject of the simulation. This can avoid unnecessary wear and tear on and damage to the real-world environment or real-world agent and can allow the control neural network to be trained and evaluated on situations that occur rarely or are difficult or unsafe to re-create in the real-world environment. For example the system may be partly trained using a simulation of a mechanical agent in a simulation of a particular real-world environment, and afterwards deployed to control the real mechanical agent in the particular real-world environment. Thus in such cases the observations of the simulated environment relate to the real-world environment, and the selected actions in the simulated environment relate to actions to be performed by the mechanical agent in the real-world environment.

Optionally, in any of the above implementations, the observation at any given time step may include data from a previous time step that may be beneficial in characterizing the environment, e.g., the action performed at the previous time step, the reward received at the previous time step, or both.

Generally, the agent neural network can have any appropriate neural network architecture that enables it to perform its described functions, e.g., processing data identifying the task to be performed and an observation to generate an action selection output that characterizes an action to be performed by the agent in response to the observation. For example, the agent neural network can include any appropriate number of layers (e.g., 5 layers, 10 layers, or 25 layers) of any appropriate type (e.g., fully connected layers, convolutional layers, attention layers, transformer layers, etc.) and connected in any appropriate configuration (e.g., as a linear sequence of layers, with or without residual connections).

In one example, the action selection output may include a respective numerical probability value for each action in a set of possible actions that can be performed by the agent. The system can select the action to be performed by the agent, e.g., by sampling an action in accordance with the probability values for the actions, or by selecting the action with the highest probability value.

In another example, the action selection output may directly define the action to be performed by the agent, e.g., by defining the values of torques that should be applied to the joints of a robotic agent.

In another example, the action selection output may include a respective Q value for each action in the set of possible actions that can be performed by the agent. The system can process the Q values (e.g., using a softmax function) to generate a respective probability value for each possible action, which can be used to select the action to be performed by the agent (as described earlier). The system could also select the action with the highest Q value as the action to be performed by the agent.

The Q value for an action is an estimate of a "return" that would result from the agent performing the action in to the current observation and thereafter selecting future actions performed by the agent 102 in accordance with current values of the parameters of the agent neural network.

A return refers to a cumulative measure of "rewards" received by the agent, for example, a time-discounted sum of rewards. The agent can receive a respective reward at each time step, where the reward is specified by a scalar numerical value and characterizes, e.g., a progress of the agent towards completing an assigned task.

In some cases, the system can select the action to be performed by the agent in accordance with an exploration policy. For example, the exploration policy may be an $\epsilon$-greedy exploration policy, where the system selects the action to be performed by the agent in accordance with the action selection output with probability $1-\epsilon$, and randomly selects the action with probability $\epsilon$. In this example, $\epsilon$ is a scalar value between 0 and 1.

One specific example of an architecture for the agent neural network will be described further with reference to FIG. 4.

The training system 100 maintains a population repository 140 storing population data specifying a population of one or more candidate agent neural networks 142A-M. The population repository 140 is implemented as one or more logical storage devices in one or more physical locations or as logical storage space allocated in one or more storage devices in one or more physical locations. At any given time during training, the population repository 140 stores data specifying the current population of the candidate agent neural networks 142A-M.

In particular, the population repository 110 stores, for each candidate agent neural network 142A-M in the current population, a set of maintained values that defines the respective candidate agent neural network. The set of maintained values includes network parameters, hyperparameters, and in implementations it is also convenient to maintain performance measures (or "performance" for short) for each candidate agent neural network 142A-M on different tasks. For example, for candidate agent neural network A 142A, the set of maintained values includes network parameters A 144A, hyperparameters A 146A, and performance A 148A (which can include a respective performance for each different task). When there are multiple candidate agent neural networks in the population, each candidate agent neural network will generally have the same architecture, but different respective parameter values and in some cases different respective hyperparameter values from the other candidate agent neural networks in the population.

The hyperparameters for a candidate agent neural network are values that impact how the values of the network parameters, e.g. weights, are updated by training. The hyperparameters can include discount factor, learning rate, objective function values, or weights assigned to various terms of the objective function, and the like. In addition, the hyperparameters can include one or more specified values for use in determining whether to train the candidate agent neural network on a given candidate task. Thus in general in the described system the hyperparameters control learning of the parameters (which may take place, e.g., by backpropagation of gradients of one or more objective functions).

To train the agent neural network, the training system 100 also maintains a training data repository 130 storing training data for training the candidate agent neural networks 142A-M. The training data repository 120 is implemented as one or more logical storage devices in one or more physical locations or as logical storage space allocated in one or more storage devices in one or more physical locations. The training data repository 130 stores data defining a set of candidate tasks 132A-N on which a candidate agent neural network can be trained and, for each candidate task, a corresponding a control policy 133A-N that can be used to control the agent to perform the candidate task, e.g., a control policy 133A for task A 132A. The training data repository 130 optionally stores data defining a set of validation tasks for evaluating the performance of the candidate agent neural networks 142A-M on the validation tasks.

The training system 100 can receive the data in any of a variety of ways. For example, the system 100 can receive the data defining the set of candidate tasks and/or the validation tasks as an upload from a remote user of the system over a data communication network (e.g., using an application programming interface (API) made available by the training system 100). As another example, the training system 100 can receive an input from a user specifying which data that is already maintained by the training system 100 should be used as the data defining the set of candidate tasks and/or the validation tasks.

In some implementations, the training data repository 130 remains fixed over the course of the training process while in other implementations, the training data repository 130 expands (e.g., until infinity) or contracts as iterations of the training process are performed, for example new candidate tasks can be dynamically added to the repository, and existing tasks on which a predetermined number of candidate agent neural networks have all achieved a threshold performance can be discarded. In these other implementations, the training system 100 can use a task generation engine 124 to repeatedly, i.e., at each of multiple training iterations over the course of training, generate new tasks from a space of candidate tasks, e.g. to generate a multi-task continuum. This space of candidate tasks can be parameterized by a set of task parameters that are each associated with one or more values, e.g., scores, discrete values, or continuous values. For example the task generation engine 124 can generate the tasks randomly, e.g., by selecting different task parameter values randomly from the set of task parameters. Next, to actually generate the task in accordance with these selected task parameter values, the training system 100 can use any of the example techniques described in Shaker, Noor, et al. *Procedural content generation in games*. Switzerland: Springer International Publishing, 2016, in addition to or instead of other known digital content generation techniques.

In general, the set of task parameters can include any of a variety of adjustable parameters which can collectively define the space of candidate tasks. For example, the set of task parameters can include a first plurality of environment parameters which define different properties or characteristics of an environment being interacted with by an agent. In more detail, the environment parameters can define or otherwise specify: the static topology of the environment (e.g., the layout and structure of topological building blocks of the environment), the illumination of the environment, the type or format of the observations characterizing the states of the environment that can be provided to the agent, the properties of the dynamic objects that are present in the environment (e.g., the positions and physical properties of target objects or obstacles), the predetermined set of actions that can be performed by the agent in response to receiving an observation, the number of other agents (in the cases of competitive or cooperative tasks) that are present in the environment, or a combination thereof and possibly more.

As another example, the set of task parameters can include a second plurality of goal parameters which define or otherwise specify different goals for each of the one or more agents to achieve when interacting with the environment. The goal parameters can for example include various terms of a reward function that is used to compute the rewards (represented as numerical values) to be issued to an agent in response to the agent performing different actions when interacting with the environment. The rewards generally reflect the progress of the agent toward accomplishing a specified goal for the candidate task that the agent is configured to perform.

The training system 100 can use a population-based training (PBT) engine 120 to train the population of one or more candidate agent neural networks 142A-M using a population-based training technique, described in more detail in PCT Patent Application No. PCT/EP2018/082162, which is herein incorporated by reference. As part of the training, the PBT engine 120 trains each candidate agent neural network on a respective set of one or more tasks to update the parameter values of the parameters of the candidate agent neural networks in the population repository 140. However, unlike conventional population-based training, prior to training a given candidate agent neural network on any given candidate task, the PBT engine 120 obtains data identifying the candidate task for training the candidate agent neural network and obtains data specifying a control policy for the candidate task.

In particular, the PBT engine 120) determines whether to train the candidate agent neural network on the candidate task based on (i) a performance of the candidate agent neural network on the candidate task (i.e., when used in accordance with the parameter values currently stored in the population data for the candidate agent neural network), (ii) a performance of the control policy for the candidate task on the candidate task and (iii) one or more of the hyperparameter values for the candidate agent neural network. Generally, the PBT engine 120 will only train the candidate agent neural network on the given task if the PBT engine determines that the task will be "useful" for the candidate given the current stage of learning. i.e., given the current values of the parameters of the candidate stored in the population data. The PBT engine 120 can determine this, in part, based on the performance of the control policy relative to the performance of the candidate.

In response to determining to train the candidate agent neural network on the candidate task, the PBT engine 120 trains the candidate agent neural network on the candidate task to update the parameter values of the parameters of the agent neural network. In response to determining not to train the candidate agent neural network on the candidate task, the system refrains from training the candidate agent neural network on the candidate task.

The use of the control policies thus improves the effectiveness and efficiency of the training process, e.g., by allowing the PBT engine 120 to only train the candidate agent neural network on the candidate task if the performance of candidate agent neural network is significantly better than that of the control policy. In some implementations, for each candidate task, e.g., task A 132A, the corresponding control policy, e.g., control policy 133A, can be a fixed policy, e.g., a random action policy that selects actions at random, while in other implementations, the corresponding control policy can be a policy that is controlled by a candidate from a preceding training generation, i.e., in accordance with the historical network parameter values of the candidate from an earlier point during the training. In these other implementations, the use of the control policy additionally allows the PBT engine 120 to determine whether the performance of the candidate agent neural network has recently improved or worsened relative to a preceding training iteration, and accordingly take appropriate measures, for example to adjust the hyperparameters or simply removing it from the current population.

In some implementations, the PBT engine 120 keeps the hyperparameters for the candidates fixed during the training. In some other implementations, the PBT engine 120 adjusts the hyperparameters for the candidates during training in order to ensure that the dynamic task selection described above continues to only select tasks that are useful for learning as the parameter values of the candidate change over the course of training.

Some or all of the tasks on which the candidates are trained can be multi-agent tasks, i.e., tasks that require the agent that is being controlled using the candidate to interact with one or more other agents controlled using another policy. For these tasks, the system can use any of a variety of policies to control the one or more other agents. For example, the system can use a fixed policy, e.g., a random action policy that selects actions at random, a no-op action policy in which the other agent does not perform any actions, and so on, an expert policy that represents behavior of an expert agent, or a policy that is controlled by a high performing candidate from a preceding training generation.

After training, the training system 100 can select one of the candidates in the population for use as the agent neural network, i.e., for use in controlling the agent to perform new tasks. For example, the training system 100 can select the highest performing candidate after the training has been completed. Alternatively, the training system 100 can use an ensemble of multiple candidates in the population as the final agent neural network.

Figure 2:
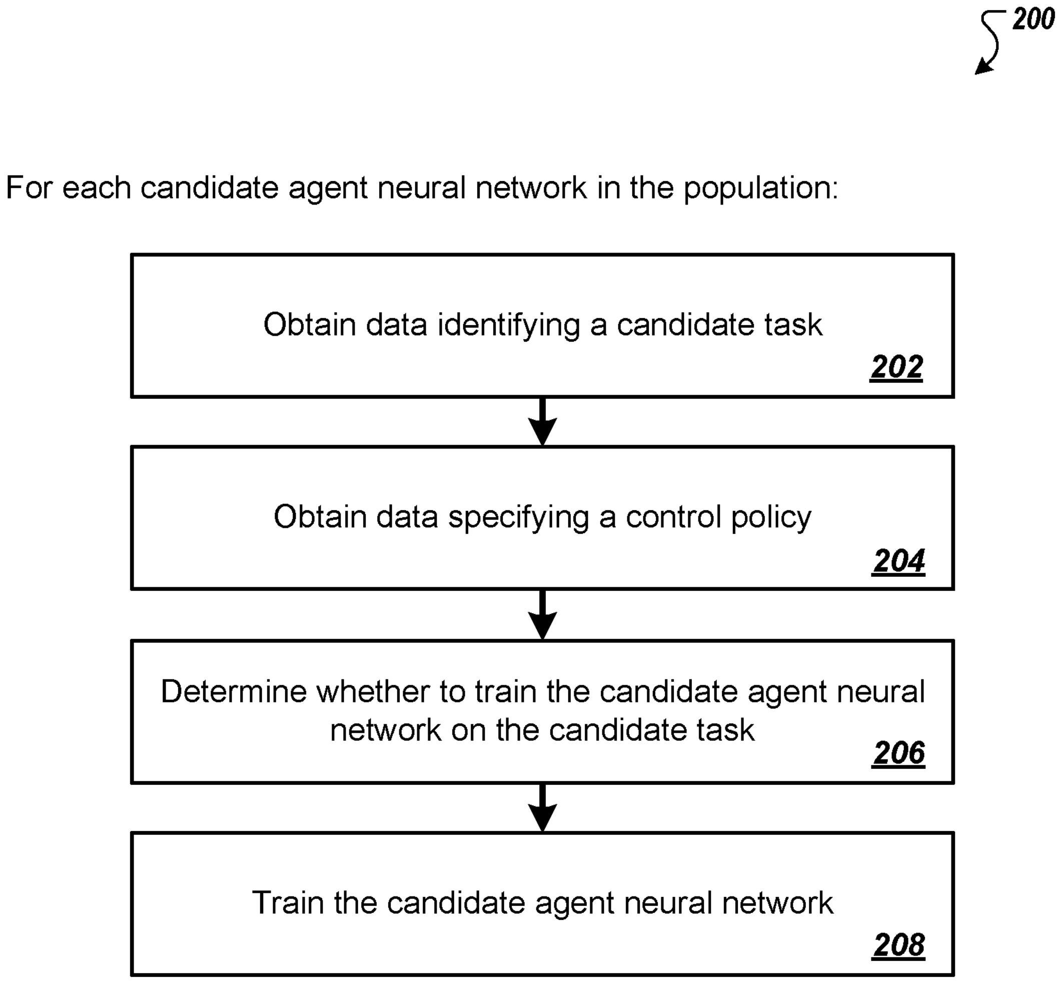
FIG. 2 is a flow chart of an example process for training a population of candidate agent neural networks.

FIG. 2 is a flow chart of an example process 200 for training a population of candidate agent neural networks. For convenience, the process 200 will be described as being performed by a system of one or more computers located in one or more locations. For example, a population based neural network training system, e.g., the training system 100 of FIG. 1, appropriately programmed in accordance with this specification, can perform the process 200.

As described above, the system maintains population data specifying a population of one or more candidate agent neural networks. The population data specifies, for each candidate agent neural network in the population, (i) respective parameter values of the parameters of the candidate agent neural network. (ii) respective hyperparameter values for training the candidate agent neural network, and (iii) a performance for the candidate agent neural network (which can include a respective performance for each different task).

The system repeatedly performs the process 200 for each candidate neural network in the population. In some implementations, the system repeatedly performs the process 200 for each candidate neural network in parallel and asynchronously from performing the process for each other candidate neural network in the population.

The system obtains data identifying a candidate task for training the candidate agent neural network (step 202). The system will generally obtain different candidate task at different iterations. Different tasks may involve different environments being interacted with by an agent controlled using the candidate agent neural network, different goals for the agent to achieve when interacting with the environment, different number of other agents that are present in the environment (in the cases of competitive or cooperative tasks), and so on.

In some implementations, the candidate task can be a new task that is automatically and dynamically (i.e., over the course of the training) generated by the system in accordance with different sets of task parameters sampled from the space of candidate task. In other implementations, the candidate task can be obtained by sampling a fixed number of candidate tasks from the set of candidate tasks included in the training data repository at each iteration. In some of these implementations, the system can use the same task sampling strategy for all candidate agent neural networks in the population while in others of these implementations, the system can use different, candidate-specific task sampling strategies for the population. In addition, in implementations where the system maintains data specifying a list of history candidate tasks on which the candidate agent neural network has previously been trained, the system can update the list to include the obtained candidate tasks.

The system obtains data specifying a control policy for the candidate task (step 204). Generally the control policy can be any action selection policy that can be used to control an agent to interact with the environment (including possibly other agents in the environment). For example, the control policy for the candidate task is a uniform random action policy that takes actions selected uniformly at random from a predetermined set of actions when controlling the agent to perform the candidate task. As another example, the control policy for the candidate task is a single task policy that uses, when controlling the agent to perform the candidate task, a single candidate agent neural network that has been trained only on the candidate task. As another example, the control policy for the candidate task is a policy that uses, when controlling the agent to perform the candidate task, an instance of the candidate agent neural network but with historical parameter values for the network parameters of the candidate agent neural network from an earlier time point during the training of the candidate agent neural network.

The system determines whether to train the candidate agent neural network on the candidate task (step 206) based on (i) a performance of the candidate agent neural network on the candidate task, (ii) a performance of the control policy on the candidate task and (iii) one or more of the hyperparameter values for the candidate agent neural network.

Specifically, to make this determination, the system can use a planning algorithm, e.g., a Monte Carlo tree search (MCTS) algorithm or another look-ahead planning algorithm, to make a prediction about multiple future states after the initial state of the environment at a given time step. This is referred to as a task episode. The task episode represents a rollout of the environment at times after the given time step, assuming that the agent performs certain actions selected by using the candidate agent neural network. The system can run the planning algorithm to repeatedly generate a plurality of task episodes, e.g., five, ten, twenty, or more task episodes, for the candidate task.

A task episode refers to a sequence of time steps over which the agent interacts with the environment. A task episode can terminate, e.g., when the agent has interacted with the environment for a predefined number of time steps, or when the agent completes a task.

In some implementations, each task episode can include a sequence of multiple trajectories, where each trajectory in turn can include a respective current observation characterizing a respective current state of the environment, a respective current action performed by the agent in response to the current observation, a respective next state characterizing a respective next state of the environment, and a reward received in response to the agent performing the current action.

For each of the plurality of task episodes of the candidate task, the system determines a respective candidate agent return received by controlling the agent to perform the task episode of the candidate task using the candidate agent neural network. The system also determines a respective control policy return received by controlling the agent to perform the task episode of the candidate task using the control policy. The candidate agent return and the control policy return can both be a task-specific return that is computed in accordance with a reward function defined by the selected task parameters, e.g., as a cumulative measure of rewards received by the agent in response to performing one or more actions when interacting with the environment.

In some implementations, the system determines to proceed to train the candidate agent neural network on the candidate task only when a performance of the candidate agent neural network as measured by the respective candidate agent returns does not exceed a threshold level of performance that is defined by the hyperparameter values for the candidate agent neural network.

In these implementations, the system can determine to train the candidate agent neural network on the candidate task only when a fraction of the task episodes for which the respective candidate agent return exceeds a first specified value is less than a second specified value. For example, the first specified value may be an integer or floating-point value between a possible range of total rewards that can be received by the agent, and the second specified value may be a decimal value between zero and one, where the first specified value, the second specified value, or both are hyperparameter values for the candidate agent neural network.

An example of this criterion in mathematical representation can be:

$$Pr[R_{\pi}(x) > m_s] < m_{solved},$$

where $R_{\pi}(x)$ is the respective candidate agent return, and $m_s$ and $m_{solved}$ are the first and second specified value, respectively.

In some implementations, the system determines to train the candidate agent neural network on the candidate task only when a performance of the candidate agent neural network as measured by the respective candidate agent returns exceeds a performance of the control policy as measured by the respective control policy returns by more than a threshold level of performance that is defined by the hyperparameter values for the candidate agent neural network.

In these implementations, the can system determine to train the candidate agent neural network on the candidate task only when a fraction of task episodes for which the respective candidate agent return exceeds the respective control policy return by at least a third specified value is greater than a fourth specified value. For example, the third specified value may be an integer or floating-point value between a possible range of total rewards that can be received by the agent, and the fourth specified value may be a decimal value between zero and one, where the third specified value, the fourth specified value, or both are hyperparameter values for the candidate agent neural network. The third and the fourth specified values may be the same as or different than the first and second specified values, respectively.

An example of this criterion in mathematical representation can be:

$$Pr[R_{\pi}(x) > R_{\pi_{cont}}(x) + m_{>}] > m_{>cont},$$

where $R_{\pi}(x)$ is the respective candidate agent return, $R_{\pi cont}(x)$ is the respective control policy return, and $m_{>}$ and $m_{>cont}$ are the third and fourth specified value, respectively.

In some implementations, the system determines to train the candidate agent neural network on the candidate task only when a performance of the control policy as measured by the respective control policy returns is lower than a threshold level of performance that is defined by the hyperparameter values for the candidate agent neural network. That is, the system determines to train the candidate agent neural network on candidate tasks that require a more sophisticated, or advanced, control policy than, e.g., a uniform random action policy, in order to achieve the specified goal of the candidate task.

In these implementations, the system can determine to train the candidate agent neural network on the candidate task only when an average (or median, or other measure of central tendency) of the respective control policy returns is less than a fifth specified value. For example, the fifth specified value may be an integer or floating-point value between a possible range of total rewards that can be received by the agent, where the fifth specified value is a hyperparameter value for the candidate agent neural network. The fifth specified value may be the same as or different than the first or third specified value.

An example of this criterion in mathematical representation can be:

$$V_{\pi_{cont}}(x) < m_{cont},$$

where $V_{\pi cont}(x)$ is the expected return of the respective control policy, and $m_{cont}$ is the fifth specified value.

In any of the above implementations, in response to determining to train the candidate agent neural network on the candidate task, the system trains the candidate agent neural network on the candidate task using any appropriate reinforcement learning technique to update the maintained values of the network parameters of the agent neural network (step 208), i.e., by optimizing an objective function that is dependent on the rewards received from the environment by the agent controlled using the candidate agent neural network. For example, the reinforcement learning technique can be an on-policy RL training technique, e.g., one of the RL algorithms described in more detail at Song, et al., *V-MPO: On-policy maximum a posteriori policy optimization for discrete and continuous control*, International Conference on Learning Representations, 2019, and the system can train the candidate agent neural network on the candidate task for a fixed number of iterations or a set period of time.

Applied in tandem with the reinforcement learning technique is a population-based training technique. Specifically, the system trains the candidate neural network on a respective set of one or more candidate tasks using the maintained values for the hyperparameters and network parameters of the candidate agent neural network, to iteratively generate updated network parameters for the candidate agent neural network, until PBT termination criteria are satisfied. PBT termination criteria are one or more conditions set, that when met by a candidate agent neural network, cause the system to update the repository for the candidate agent neural network, with new network parameters, new hyperparameters, and new performance measure. An example of a PBT termination criterion being met is when a candidate agent neural network has been trained on the respective set of one or more candidate tasks for a fixed number of iterations (e.g., 1e4, 1e6, 1e8, or the like) of the iterative training process or a set period of time (e.g., one hour, two hours, ten hours, or the like). Another example of a PBT termination criterion being met is when a candidate agent neural network falls below a certain performance threshold.

Upon meeting the PBT termination criteria, the system executes a population repository update process including determining an updated performance for the candidate agent neural network in accordance with the updated values of the network parameters for the candidate agent neural network. The updated performance reflects the potential performance increase of the candidate agent neural network as a result of the updated network parameters.

The system also determines new values of the hyperparameters and network parameters for the candidate neural network. In some implementations, the system determines new values of the hyperparameters (i.e., adjusts the maintained hyperparameter values for the candidate agent neural network) and network parameters for the candidate agent neural network based at least on the maintained performances for the population of candidate agent neural networks in the population repository and the updated performance of the candidate agent neural network.

After determining the new network parameters, new hyperparameters, and new performance for the candidate agent neural network, the iterative training process continues. That is, the system trains the candidate agent neural network through reinforcement learning on a respective set of one or more newly obtained candidate tasks using the new hyperparameters and new network parameters of the candidate neural network, to iteratively generate updated network parameters for the candidate agent neural network. The system will continue the iterative training process for the candidate agent neural network until a next PBT termination criteria is satisfied (and the system repeats the population repository update process for the candidate agent neural network). While in some implementation the system can terminate the iterative training process for the candidate agent neural network, e.g., when the PBT termination criteria has been satisfied for a predetermined number of times or when performance criteria is satisfied to indicate to the system to stop training, in other implementations, the system can continue the iterative training process until infinity.

Figure 3:
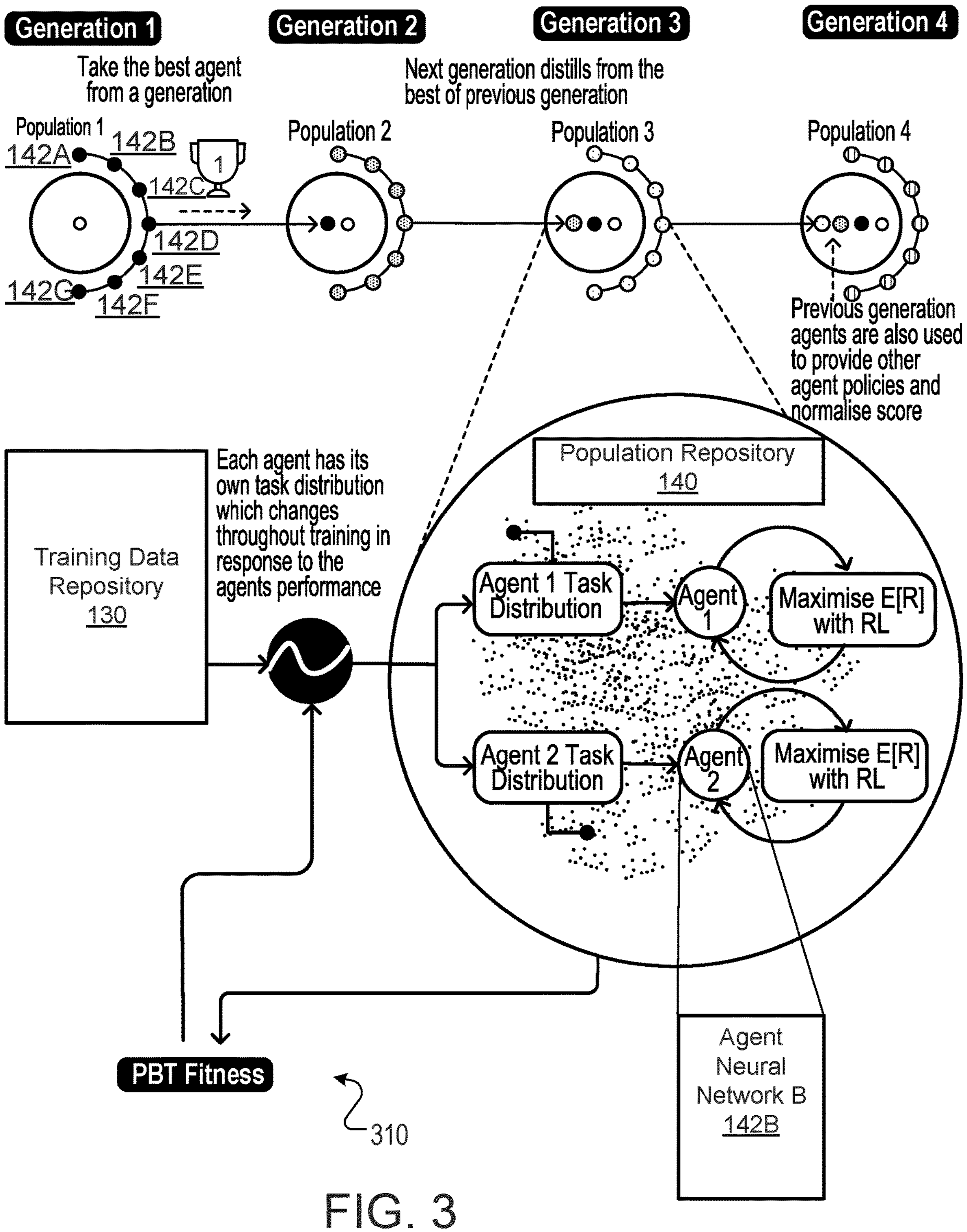
FIG. 3 shows an example illustration of training a population of candidate agent neural networks.

FIG. 3 shows an example illustration of training a population of candidate agent neural networks. A training system, e.g., the training system 100 of FIG. 1, executes iterative training processes for candidate agent neural networks A-G 142A-G in the population ("Population 1"), in parallel, and until PBT termination criteria are satisfied. As the training system executes the iterative training processes for candidate agent neural networks A-G 142A-G, network parameters A-G for the candidate agent neural networks are updated accordingly.

The system updates the performance of each candidate agent neural network based on evaluation of the candidate agent neural network's performance on each of a plurality of validation tasks. The plurality of validation tasks can be obtained by way of sampling from a set of validation tasks. The number of tasks in the validation set is generally much smaller than the total number of tasks in the set of candidate tasks. For example, training data repository may store a set of one million, five million, or more candidate tasks, while the number of validation tasks is on the order of thousands. In some implementations, the sampling can be random sampling while in other implementations, the sampling can alternatively be skewed sampling, so as to ensure uniform coverage of set of validation tasks. The updated performance for each validation task can be dependent on a task-specific return that is computed in accordance with a reward function defined by the selected task parameters, e.g., as a cumulative measure of rewards received by the agent in response to performing one or more actions selected using the candidate agent neural network when interacting with the environment.

Unlike in conventional population-based training where the performance is directly used to update the hyperparameters and network parameters for each candidate agent neural network, because the evaluation tasks may vary in terms of their complexity, scale of return, or both, the system additionally computes a respective PBT fitness measure (or "fitness measure" for short) 310 for each candidate agent neural network, which is then used to update the hyperparameters and network parameters for the candidate agent neural network. The fitness measure 310 allows for better characterization of network performance and robustness across the set of evaluation tasks.

In particular, the respective fitness measure, which can be viewed as a multi-dimensional measure of performance of each candidate agent neural network across the plurality of validation tasks, is computed by determining a respective normalized percentile metric for the candidate agent neural network on each of the plurality of validation tasks.

Figure 7:
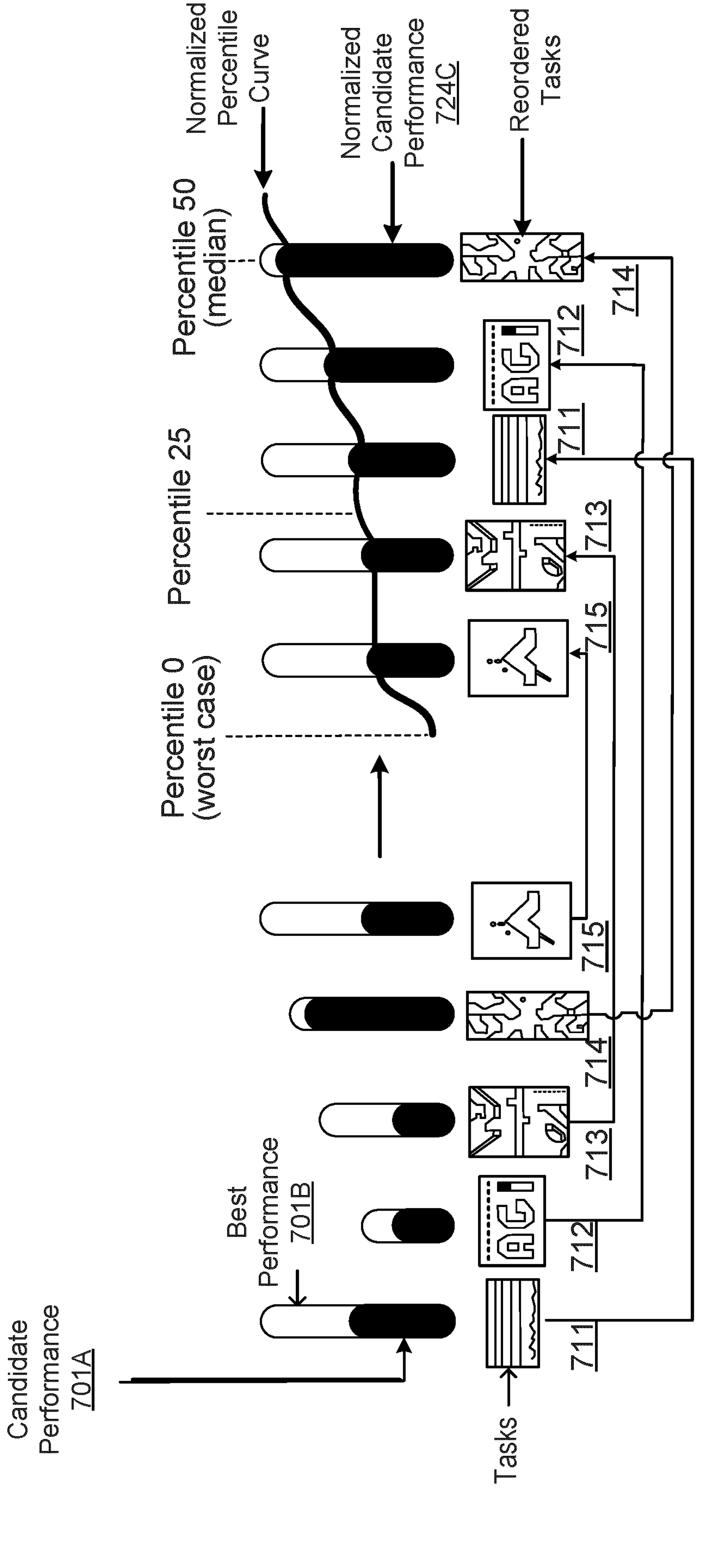
FIG. 7 shows an example illustration of determining a normalized percentile metric.

FIG. 7 shows an example illustration of determining a normalized percentile metric. As illustrated, for each candidate agent neural network, to determine the normalized percentile metric over the population of candidate agent neural networks for each of the validation tasks 711, 712, 713, 714, and 715, the system can use the best performance of the candidates on the validation task (e.g., best performance 701B for task 711) as a normalizing constant, and then use the normalizing constant to normalize the performance of the candidate agent neural network (e.g., candidate agent neural network performance 701A for task 711). For each candidate agent neural network, the normalized performance of the candidate across the plurality of validation tasks (e.g., the normalized candidate agent neural network performance 724C for task 714) are then reordered, e.g., arranged in a monotonically increasing order (as indicated by the normalized percentile curve shown in FIG. 7), from which the respective normalized percentile metric for the candidate on each validation task can be determined.

In the example of FIG. 7, the best performance of the candidates on any given validation task can be the best performance attained by a candidate agent neural network, as measured by the respective candidate agent returns received by the candidate on the validation task (in the case of a single-agent task), or can alternatively be the best performance attained by one of a group (the Nash equilibrium) of multiple candidate agent neural networks, as measured by the respective candidate agent returns received by the candidate on the validation task (in the case of a multiple-agent task).

The system then applies the population-based training technique to the respective fitness measures to adjust the respective hyperparameter values for each of one or more candidate agent neural networks 142A-G in the population.

For example, in response to comparing the respective fitness measures of candidate agent neural networks against each other and determining that the fitness measure for the candidate agent neural network 142D is better than the respective fitness measure for another candidate agent neural network in the population, e.g., the candidate agent neural network 142E, the system identifies the candidate agent neural network 142D as the "better" performing candidate in the current population. For example the comparison result can be based on Pareto domination. As an example here the performance of a candidate may be considered to Pareto dominate the performance of another candidate if all the fitness measures, e.g. normalized percentile metrics, of the candidate for a plurality of tasks, e.g. the plurality of validation tasks, are at least as good as the those for another candidate for the plurality of tasks. e.g. the plurality of validation tasks, but it is strictly better in the fitness measure, e.g. normalized percentile metric, for at least one of the tasks e.g. the validation tasks.

In this example, the system can then determine new values of the network hyperparameters for the other candidate agent neural network by "exploiting" the network hyperparameters for the candidate agent neural network 142D, i.e., adjusting the hyperparameter values for the other candidate agent neural network to be equal to the hyperparameter values for the candidate agent neural network 142D. In this example, the system can alternatively determine new values of the network hyperparameters for the other candidate agent neural network by "exploring" the network hyperparameters for the candidate agent neural network 142D, i.e., adjusting the hyperparameter values for the other candidate agent neural network to be equal to a mutated (e.g., randomly perturbed) version of the hyperparameter values for the candidate agent neural network 142D.

The system similarly applies the population-based training technique to the respective fitness measures to adjust the respective parameter values for each candidate agent neural network 142A-G in the population. Continuing the above example where the candidate agent neural network 142D has been identified as the "better" performing candidate in the current population, the system can set the respective parameter values for another candidate agent neural network, e.g., the candidate agent neural network 142E, equal to the respective parameter values (or a mutated version of the respective parameter values) for the candidate agent neural network 142D.

As illustrated in FIG. 3, in some implementations, the system additionally incorporates a generational training technique into the population-based training technique, to further improve the effectiveness and speed of the RL training. In these implementations, the training of the candidate agent neural networks spans over a sequence of training generations, where the respective candidate agent neural networks being trained at each training generation may be collectively viewed as one particular population. For example, each training generation can include a fixed number of iterations (e.g., 1e8, 5e8, 10e8, or the like) of the iterative training process or a set period of time (e.g., 12 hours, 24 hours, 48 hours, or the like).

Although FIG. 3 shows the example implementation where a respective population of seven candidate agent neural networks are trained at each training generation in a sequence of four training generations, there can be more, and sometimes orders of magnitude more, candidate agent neural networks that are trained for more or less training generations.

Generational population-based training makes it possible to use a policy distillation technique during training, which generally enables a candidate agent neural network in a current training generation to bootstrap its behavior from another candidate in the previous training generation. Performing policy distillation technique involves, during a current training generation of a sequence of training generations during the training of the population of candidate agent neural networks, training a candidate agent neural network on an identical or different candidate task on which a "better" performing candidate agent neural network (e.g., in terms of or task-specific performance or fitness measure) from a preceding training generation has already been trained to optimize an expected return, while distilling from the best performing candidate agent neural network, for example distilling from the best performing candidate at the end of the preceding training generation that immediately precedes the current training generation in the sequence.

Specifically, the system can incorporate into the objective function used in the RL training of the candidate agent neural network an auxiliary policy distillation loss term $$\ell_t^{\mathrm{exp}-distill} := (1 - r_{t-1}) \cdot \ell_t^{distill},$$

where $$\ell_t^{distill} := KL\left[\left[\!\left[\pi_t^{teacher}\right]\!\right] \| \pi_t\right],$$

and where $\pi^{teacher}$ and $\pi$ are action selection outputs of the "better" performing candidate agent neural network and the "learning" candidate agent neural network, respectively. In the example equations above, the policy distillation loss term is masked over environment states where a reward is obtained, i.e., the auxiliary loss (in Kullback-Leibler divergence) only affects the RL training on certain time steps in various training task episodes where no reward is received.

In addition, in these implementations, the "better" performing candidate agent neural network (e.g., in terms of or task-specific performance or fitness measure) from a preceding training generation can be used to control the other agents in multi-agent candidate tasks to increase the diversity of the RL training.

In some implementations, at least some candidate agent neural networks in the population corresponding to each of one or more of the training generations in the sequence can be trained on a self-reward play objective. This can be used to aid in the RL training by ensuring that the candidate agent neural network only fails to achieve the corresponding goals on a fewer number of tasks. Specifically, the self-reward play objective rewards a candidate agent neural network for satisfying a goal g, and after succeeding the candidate is rewarded for fulfilling not(g) within the same environment, with this flip in goal repeating after each satisfaction. For example, suppose a goal g is moving an object toward a target location, then not(g) is moving the object away from the target location. This can be seen as two agents playing in a competitive manner against themselves, where one agent must satisfy g and the other agent must satisfy not(g), however the agents act sequentially, and are controlled by the same candidate agent neural network.

Figure 4A:
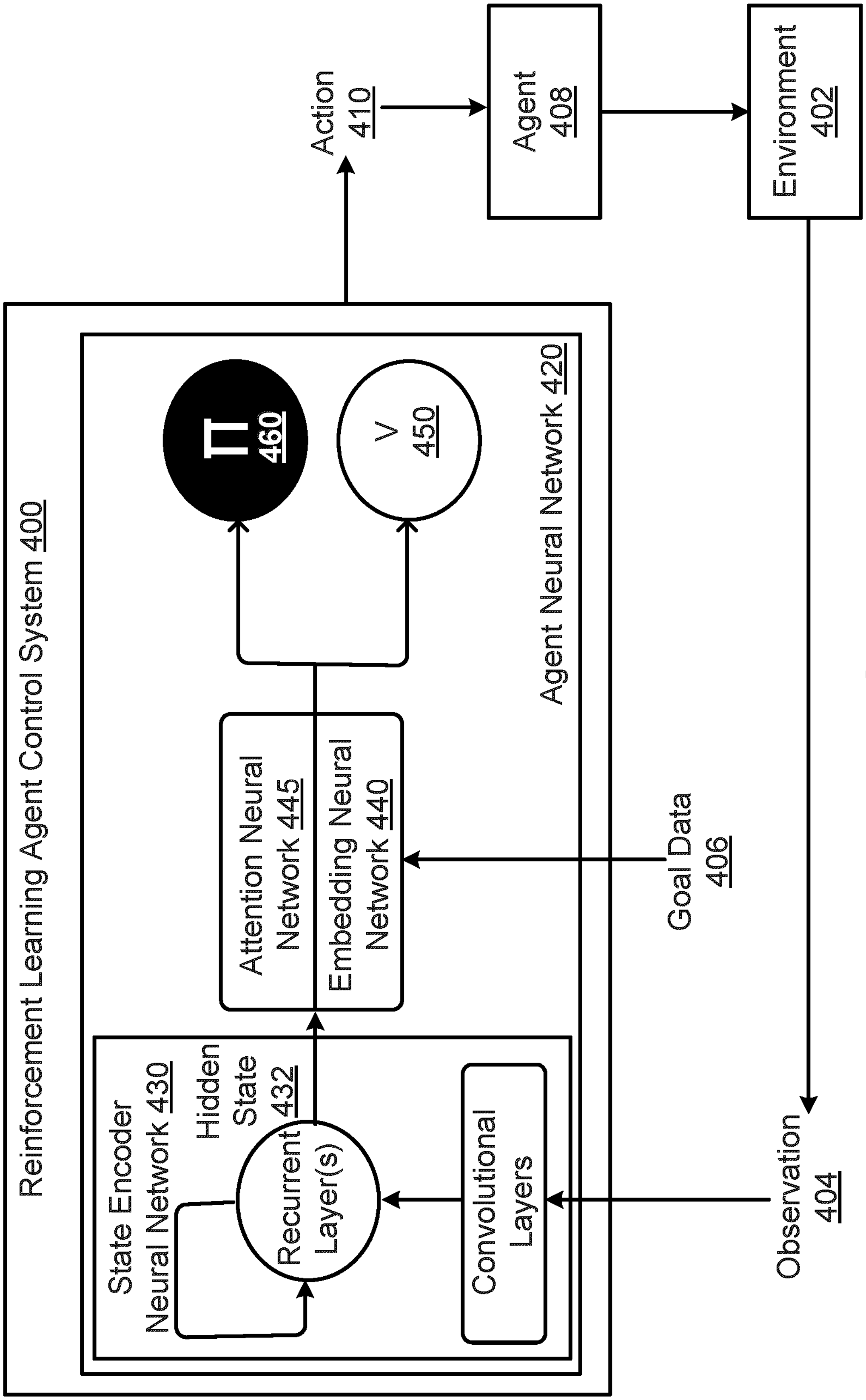
FIG. 4A shows an example reinforcement learning agent control system and FIG. 4B an example implementation of an agent neural network.

FIG. 4A shows an example reinforcement learning agent control system 400. The reinforcement learning agent control system 400 is an example of a system implemented as computer programs on one or more computers in one or more locations, in which the systems, components, and techniques described below can be implemented.

The reinforcement learning system 400 includes an agent neural network 420 that is obtained as a result of the open-ended reinforcement learning training process described in this specification.

The reinforcement learning agent control system 400 controls an agent 408 interacting with an environment 402 by using the agent neural network 420 to select actions 410 to be performed by the agent 408 and then causing the agent 408 to perform the selected actions 410.

Performance of the selected actions 410 by the agent 408 generally causes the environment 402 to transition into new states. By repeatedly causing the agent 408 to act in the environment 402, the system 400 can control the agent 408 to complete each of a plurality of specified tasks.

At each of multiple time steps, the agent neural network 420 is configured to process an input that includes (i) the current observation 404 characterizing the current state of the environment 402 and (ii) the goal data 406 representing a goal to be satisfied in order to perform the task in the environment, in accordance with trained values of the network parameters to generate an action selection output. The goal may be represented as a set of options over respective sets of predicates, where each predicate may map a current state of the environment to a corresponding reward value, and where each option is a conjunction of one or more predicates, e.g., such that reward is received only if all the predicates return non-zero reward. In some implementations, the goal data 406 can be represented as one or more tensors of numerical values, e.g., with each predicate represented as a multi-hot encoded vector.

Specifically, in some implementations, the current observation 404 characterizing the current state of the environment 402 can include information that defines the positions, orientations, velocities, and the like, of different entities (e.g., target objects, obstacles, and other agents) present in the environment. In these implementations, a set of atomic predicates $\phi_j$ in the form of a physical relation with respect to some or all of the entities can be defined, and the goal can be defined as a Boolean expression over the set of atomic predicates $\phi_j$ These physical relations can for example include: being near, on, seeing, and holding, as well as their negations, with the entities being target objects, obstacles, agents, or static topological building blocks such as the ground of the environment. An example predicate can thus be near (purple sphere, opponent), which represents a goal of having one of the opponent agents being close to a purple sphere in the environment. With the set of possible predicates fixed, a goal of an agent can be represented by a set of options (disjunctions) over sets of relevant (or necessary) predicates for this option (conjunctions). In other words, a goal can be a mapping $\phi_j$:S→{0, 1}$^d$, which assigns each observation S to a binary vector of d predicate truth values, with 0 indicating an irrelevant predicate for the goal when the environment is in the state characterized by the observation S and 1 indicating a relevant predicate for the goal when the environment is in the state characterized by the observation S. For example, a goal represented by the goal data 406 could look like $$g = \underbrace{(\phi_{j_1} \wedge \phi_{j_2})}_{option\ 1} \vee \underbrace{(\phi_{j_2} \wedge \phi_{j_3} \wedge \phi_{j_4})}_{option\ 2}$$

which, for some example predicates, could mean "Hold a purple sphere ($\phi_{j1}$) while being near a yellow sphere ($\phi_{j2}$) or be near a yellow sphere ($\phi_{j2}$) while seeing an opponent agent ($\phi_{j3}$) who is not holding the yellow sphere ($\phi_{j4}$)".

The system 400 then uses the action selection output to control the agent, i.e., to select the action 410 to be performed by the agent at the current time step in accordance with the action selection output and then cause the agent to perform the action 410, e.g., by directly transmitting control signals to the agent or by transmitting data identifying the action 410 to a control system for the agent. Example action selection outputs, as well as how they can be used to select the actions, are described above with reference to FIG. 1.

The agent neural network 420 is implemented with a neural network architecture that enables it to perform its described functions. As illustrated in FIG. 4A, the agent neural network 420 includes a state encoder neural network 430, an embedding neural network 440, an attention neural network 445, a value neural network (a value neural network "V" head) 450, and a policy neural network (a policy neural network "T" head) 460. That is, a value neural network may also be referred to as a value neural network head: similarly a policy neural network may also be referred to as a policy neural network head: the term "head" may, but need not, indicate that the value neural network and policy neural network both receive as input shared data generated by one or more layers of the attention neural network 445. Each of the neural network 420, 430, 440, 445, and 450 includes a different subset of multiple neural network layers in the agent neural network 420.

The state encoder neural network 430 can include a stack of multiple convolutional layers, followed by one or more pooling layers (e.g., max pooling layers), and followed by one or more recurrent layers (e.g., long short-term memory (LSTM) layers). The state encoder neural network 430 is configured, i.e., through training, to receive the observation 404 to update a hidden state of the state encoder neural network 430 by processing the received observation 404, i.e., to generate a current hidden state 432 that represents the current state of the environment. Typically, an embedding is an ordered collection of numeric or other values that has a fixed dimensionality. The fixed dimensionality may be dependent on the actual number LSTM neurons, e.g., 128, 256, or the like, included in each LSTM layer of the state encoder neural network 430.

The embedding neural network 440 can be a fully connected neural network, i.e., that includes multiple fully connected layers optionally followed by an activation layer (e.g., ReLU activation layer), that is configured to process the goal data 406 and the current hidden state 432 to generate (i) a predicate prediction, (ii) a goal embedding of the goal, and (iii) a respective option embedding for each of the options represented by the goal data. The embedding neural network 440, in turn, can include a predicate predictor neural network, a goal embedding neural network, and an option embedding neural network, each of which includes a respective subset of the multiple fully connected layers of the embedding neural network 440.

The predicate predictor neural network is configured to process the goal data 406 and the current hidden state 432 to generate a predicate prediction. In some implementations, the predicate prediction can be a multi-label binary classification prediction that specifies which predicate(s) from the set of atomic predicates $\phi_j$ are relevant to (e.g., are included in) the goal represented in the goal data 406, given that the environment is in the state characterized by the current observation.

The option embedding neural network is configured to process the goal data 406 and the current hidden state 432, data derived from the goal data 406 and the current hidden state 432, or both to generate a respective option embedding for each of the options. Likewise, goal embedding neural network is configured to process the goal data 406 and the current hidden state 432, data derived from the goal data 406 and the current hidden state 432, or both to generate a goal embedding of the goal. Typically, an embedding is an ordered collection of numeric or other values that has a fixed dimensionality. The fixed dimensionality may be dependent on the actual number hidden units, e.g., 128, 256, or the like, included in each fully connected layer of the embedding neural network 440.

The attention neural network 445 is configured to process an input that includes (i) the current hidden state, (ii) the goal embedding, and the (iii) the predicate prediction to generate a goal-attention hidden state. As used herein an attention neural network is a neural network that includes one or more attention layers, each attention layer being a neural network layer that includes an attention mechanism, for example a scaled dot-product attention mechanism. To generate the goal-attention hidden state, the attention mechanism maps a query and a set of key-value pairs to an output (the goal-attention hidden state), where the query can be (or otherwise derived) from the goal embedding, and where the set of key-value pairs can be derived from the current hidden state 432 (e.g., a linearly projected and/or reshaped version of the current hidden state).

In addition, the attention neural network 445 is configured to, for each of the options, process an input that includes (i) the current hidden state, (ii) the respective option embedding for the option, and the (iii) the predicate prediction to generate a respective option-attention hidden state for the option. To generate the respective option-attention hidden state for each option, the attention mechanism analogously maps a query and a set of key-value pairs to an output (the option-attention hidden state), where the query can be the option embedding for the option, and where the set of key-value pairs can be derived from the current hidden state 432.

The value neural network 450 can be a fully connected neural network, i.e., that includes one or more fully connected layers optionally followed by an activation layer (e.g., ReLU activation layer), that is configured to process the goal-attention hidden state to generate a goal value estimate for the goal that represents an estimated return that would be achieved, e.g., a cumulative measure of rewards that would be received by the agent, if the agent attempts to satisfy the goal starting from the current state. The value neural network 450 is also configured to, for each of the options, process the respective option-attention hidden state for the option using the value neural network head to generate a respective option value estimate for the option that represents an estimated return that would be achieved if the agent attempts to satisfy the option starting from the current state.

The goal-attention hidden states and the respective option-attention hidden states are then combined to generate a combined hidden state to be provided to the policy neural network 460, which is configured to process the combined hidden state to generate the action selection output. In some implementations, the combined hidden state can be an unweighted combination while in other implementations, the combined hidden state can be a weighted combination, i.e., that combines the goal-attention hidden states and the respective option-attention hidden states in accordance with their respective weights.

In some of these implementations, the respective weight for the goal and for each of the options from the goal value estimate and the respective option value estimates for the options can be computed by applying a softmax function over the goal value estimate and the respective option value estimates for the options to generate a respective softmax score for the goal and for each of the options, which are then used as the weights for computing the weighted combination. In general a softmax function is a function that converts numerical values into probabilities. In others of these implementations, the respective weights can be computed by assigning a weight of one to a highest value estimate of the goal value estimate and the respective option value estimates for the options and a weight of zero to all other value estimate of goal value estimate and the respective option value estimates for the options.

The policy neural network 460 can include one or more fully connected layers followed by one or more output layers. In some implementations, the one or more output layers can include a single softmax layer that is configured to process the output of a preceding fully connected layer to generate a probability distribution over the set of actions that can be performed by the agent. In some other implementations, the one or more output layers can include multiple softmax layers corresponding respectively to different subsets of a set of actions that can be performed by the agent, which are each configured to process the output of the preceding fully connected layer to generate a respective probability distribution over the subset. In yet other implementations, the one or more output layers can include one or more additional fully connected layers that are configured to generate a respective Q value for each action in a set of actions that can be performed by the agent.

Figure 4B:
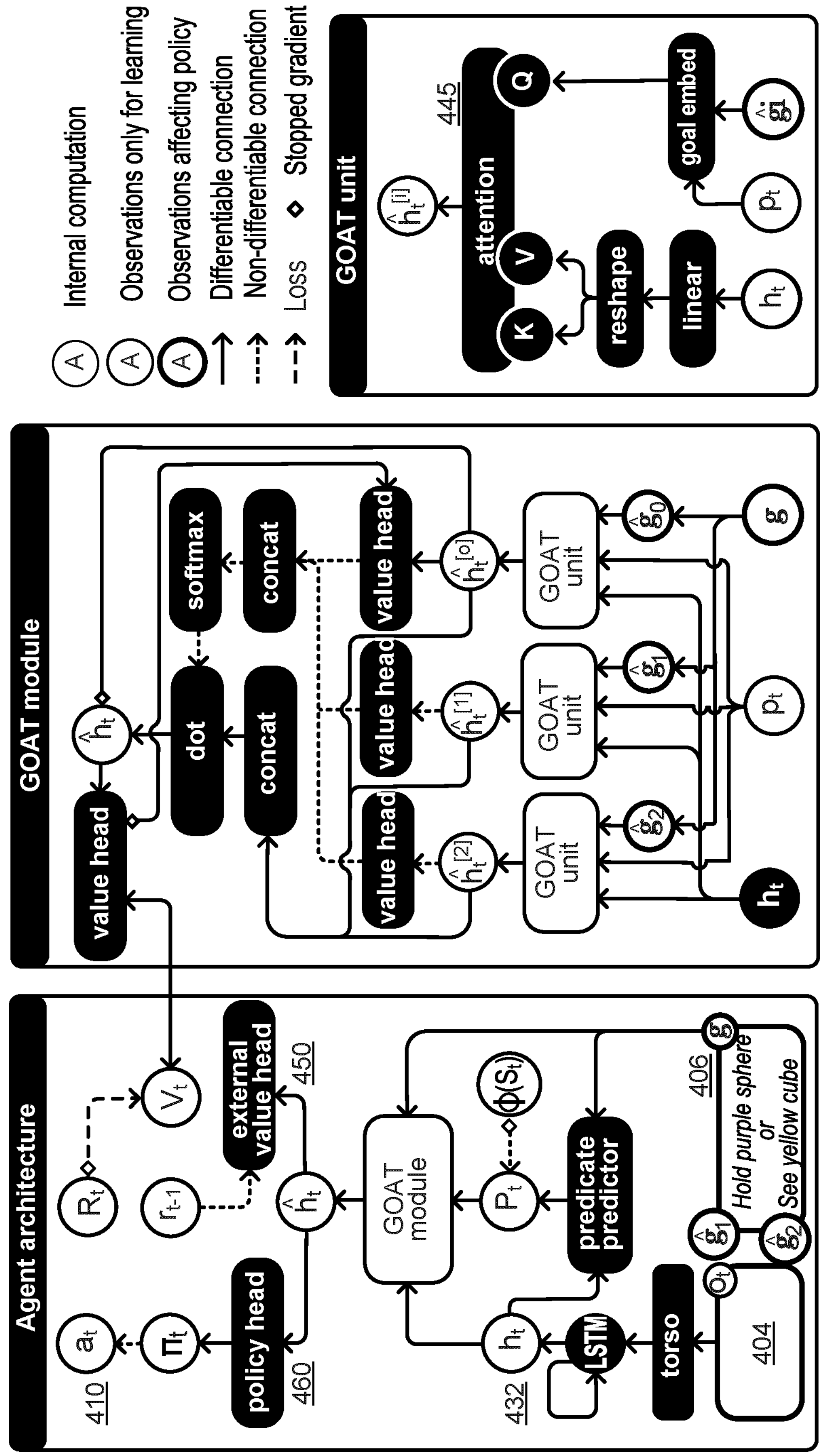

FIG. 4B shows details of one example implementation of the agent neural network 420.

Figure 5:
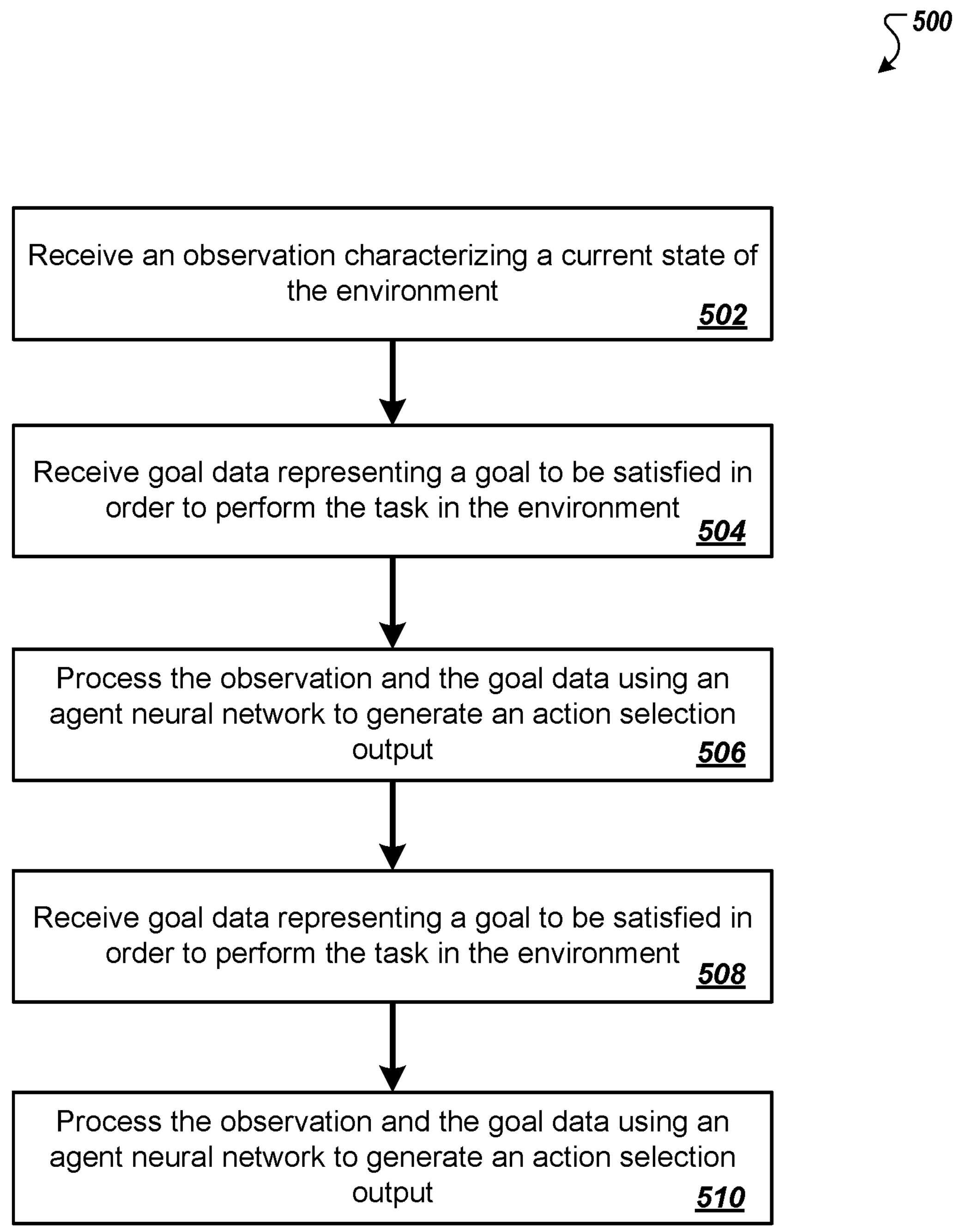
FIG. 5 is a flow chart of an example process for controlling an agent interacting with an environment.

FIG. 5 is a flow diagram of an example process 500 for controlling an agent interacting with an environment. For convenience, the process 500 will be described as being performed by a system of one or more computers located in one or more locations. For example, a reinforcement learning system, e.g., the reinforcement learning agent control system 400 of FIG. 4, appropriately programmed, can perform the process 500.

The system receives an observation characterizing a current state of the environment (step 502). For example, the observation can include an audio data segment, an image, or a sentence in a natural language. Optionally, the observation can also include information derived from the previous time step, e.g., the previous action performed, the reward received at the previous time step, or both.

The system receives goal data representing a goal to be satisfied in order to perform the task in the environment (step 504). In the received goal data, the goal is represented as a set of options over respective sets of predicates. In the example of FIG. 4, the goal is represented as a set of two options, each including a single predicate "Hold purple sphere" or "See yellow cube," although in other examples, the goal may be represented by more options that are each composed of more predicates, sometimes with an identical predicate shared across multiple options.

The system processes an input that includes the observation and the goal data using an agent neural network to generate an action selection output (step 506), as will be described further below with reference to FIG. 6. In some implementations, the action selection output can define a probability distribution over a set of actions that can be performed by the agent. In some implementations, the action selection output can include a respective Q value for each action in a set of actions that can be performed by the agent. In some implementations, the action selection output is an action from a continuous action space, i.e., all of the action values in an individual action are selected from a continuous range of possible values.

The system selects an action to be performed by the agent using the action selection output (step 508). In implementations where the action selection output defines a probability distribution, the system can select the action by sampling an action in accordance with the probability values for the actions, or by selecting the action with the highest probability value. In implementations where the action selection output includes the Q values, the system can process the Q values (e.g., using a softmax function) to generate a respective probability value for each possible action, which can be used to select the action to be performed by the agent. The system can also select the action with the highest Q value as the action to be performed by the agent.

The system causes the agent to perform the selected action (step 510), e.g., by instructing the agent to perform the action or passing a control signal to a control system for the agent.

Figure 6:
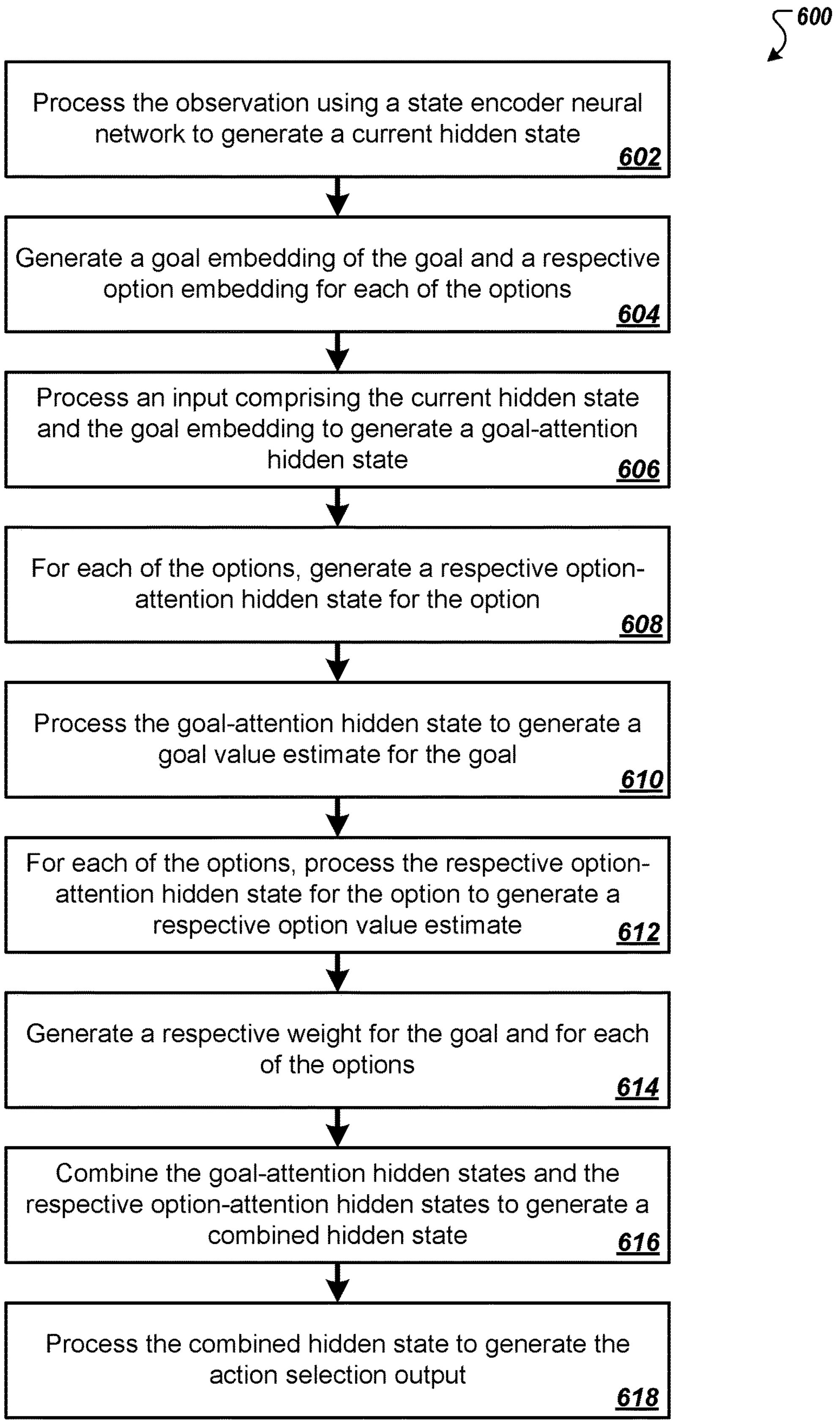
FIG. 6 is a flow chart of an example process for using an agent neural network to generate an action selection output.

FIG. 6 is a flow chart of an example process 600 for using an agent neural network to generate an action selection output. For convenience, the process 600 will be described as being performed by a system of one or more computers located in one or more locations. For example, a reinforcement learning system, e.g., the reinforcement learning system 400 of FIG. 4, appropriately programmed, can perform the process 600.

The system processes the observation using a state encoder neural network of the agent neural network to generate a current hidden state that represents the current state of the environment (step 602). The state encoder neural network includes one or more recurrent layers and is configured generate the current hidden state by processing the received current observation to modify the hidden state of the state encoder neural network that has been generated by processing previous observations.

The system processes the goal data and the current hidden state using an embedding neural network of the agent neural network to generate (i) a predicate prediction, (ii) a goal embedding of the goal, and (iii) a respective option embedding for each of the options represented by the goal data (step 604).

The system processes an input that includes (i) the current hidden state, (ii) the goal embedding, and the (iii) the predicate prediction using an attention neural network to generate a goal-attention hidden state (step 606). The goal-attention hidden state is generated at least in part by applying an attention mechanism over (i) the current hidden state, (ii) the goal embedding, and the (iii) the predicate prediction.

For each of the options, the system processes an input that includes (i) the current hidden state, (ii) the respective option embedding for the option, and the (iii) the predicate prediction using an attention neural network to generate a respective option-attention hidden state for the option (step 608). The option-attention hidden state is generated at least in part by applying an attention mechanism over (i) the current hidden state, (ii) the respective option embedding for the option, and the (iii) the predicate prediction.

The system processes the goal-attention hidden state using a value neural network of the agent neural network to generate a goal value estimate for the goal that represents an estimated return that would be achieved if the agent attempts to satisfy the goal starting from the current state (step 610).

For each of the options, the system processes the respective option-attention hidden state for the option using the value neural network to generate a respective option value estimate for the option that represents an estimated return that would be achieved if the agent attempts to satisfy the option starting from the current state (step 612).

The system generates a respective weight for the goal and for each of the options from the goal value estimate and the respective option value estimates for the options (step 614). In some implementations, generate the respective weight can include applying a softmax over the goal value estimate and the respective option value estimates for the options. In some other implementations, generate the respective weight can include assigning a weight of one to a highest value estimate of the goal value estimate and the respective option value estimates for the options and a weight of zero to all other value estimate of goal value estimate and the respective option value estimates for the options.

The system combines the goal-attention hidden states and the respective option-attention hidden states in accordance with the respective weights to generate a combined hidden state (step 616).

The system processes the combined hidden state using a policy neural network of the agent neural network to generate the action selection output (step 618).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine: in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method for training an agent neural network for use in controlling an agent to perform a plurality of tasks, the method comprising:

- maintaining population data specifying a population of one or more candidate agent neural networks, the population data specifying, for each candidate agent neural network in the population, (i) respective parameter values of the parameters of the candidate agent neural network and (ii) respective hyperparameter values for training the candidate agent neural network; and
- training each candidate agent neural network on a respective set of one or more tasks to update the parameter values of the parameters of the candidate agent neural networks in the population data, the training comprising, for each candidate agent neural network:
  - obtaining data identifying a candidate task for training the candidate agent neural network;
  - obtaining data specifying a control policy for the candidate task;
  - determining whether to train the candidate agent neural network on the candidate task based on (i) a performance of the candidate agent neural network on the candidate task, (ii) a performance of the control policy for the candidate task on the candidate task and (iii) one or more of the hyperparameter values for the candidate agent neural network; and
  - in response to determining to train the candidate agent neural network on the candidate task, training the candidate agent neural network on the candidate task to update the parameter values of the parameters of the agent neural network.

2. The method of claim 1, wherein training the candidate agent neural network on the candidate task comprises training the candidate agent neural network on the candidate task through reinforcement learning.

3. The method of claim 1, wherein the control policy for the candidate task is a uniform random action policy that takes actions selected uniformly at random from a set of actions when controlling the agent to perform the candidate task.

4. The method of claim 1, wherein the control policy for the candidate task is a single task policy that uses, when controlling the agent to perform the candidate task, a single candidate agent neural network that has been trained only on the candidate task.

5. The method of claim 1, wherein the control policy for the candidate task is a policy that uses, when controlling the agent to perform the candidate task, an instance of the candidate agent neural network but with historical parameter values for the parameters of the candidate agent neural network from an earlier point during the training of the candidate agent neural network.

6. The method of claim 1, wherein determining whether to train the candidate agent neural network on the candidate task based on (i) a performance of the candidate agent neural network on the candidate task, (ii) a performance of the control policy for the candidate task on the candidate task and (iii) one or more of the hyperparameter values for the candidate agent neural network comprises:

- for each of a plurality of task episodes of the candidate task, determining a respective candidate agent return received by controlling the agent to perform the task episode of the candidate task using the candidate agent neural network and determining a respective control policy return received by controlling the agent to perform the task episode of the candidate task using the control policy.

7. The method of claim 6, wherein determining whether to train the candidate agent neural network on the candidate task based on (i) a performance of the candidate agent neural network on the candidate task, (ii) a performance of the control policy for the candidate task on the candidate task and (iii) one or more of the hyperparameter values for the candidate agent neural network comprises:

- determining to train the candidate agent neural network on the candidate task only when a performance of the candidate agent neural network as measured by the respective candidate agent returns does not exceed a threshold level of performance that is defined by the hyperparameter values for the candidate agent neural network.

8. The method of claim 7, wherein determining to train the candidate agent neural network on the candidate task only when a performance of the candidate agent neural network as measured by the respective candidate agent returns does not exceed a threshold level of performance that is defined by the hyperparameter values for the candidate agent neural network comprises:

- determining to train the candidate agent neural network on the candidate task only when a fraction of task episodes for which the respective candidate agent return exceeds a first specified value is less than a second specified value, wherein:
- (i) the first specified value, (ii) the second specified value, or (iii) both are hyperparameter values for the candidate agent neural network.

9. The method of claim 6, wherein determining whether to train the candidate agent neural network on the candidate task based on (i) a performance of the candidate agent neural network on the candidate task, (ii) a performance of the control policy for the candidate task on the candidate task and (iii) one or more of the hyperparameter values for the candidate agent neural network comprises:

determining to train the candidate agent neural network on the candidate task only when a performance of the candidate agent neural network as measured by the respective candidate agent returns exceeds a performance of the control policy as measured by the respective control policy returns by more than a threshold level of performance that is defined by the hyperparameter values for the candidate agent neural network.

10. The method of claim 9, wherein determining to train the candidate agent neural network on the candidate task only when a performance of the candidate agent neural network as measured by the respective candidate agent returns exceeds a performance of the control policy as measured by the respective control policy returns by more than a threshold level of performance that is defined by the hyperparameter values for the candidate agent neural network comprises:

determining to train the candidate agent neural network on the candidate task only when a fraction of task episodes for which the respective candidate agent return exceeds the respective control policy return by at least a third specified value is greater than a fourth specified value, wherein:

(i) the third specified value, (ii) the fourth specified value, or (iii) both are hyperparameter values for the candidate agent neural network.

11. The method of claim 6, wherein determining whether to train the candidate agent neural network on the candidate task based on (i) a performance of the candidate agent neural network on the candidate task, (ii) a performance of the control policy for the candidate task on the candidate task and (iii) one or more of the hyperparameter values for the candidate agent neural network comprises:

determining to train the candidate agent neural network on the candidate task only when a performance of the control policy as measured by the respective control policy returns is lower than a threshold level of performance that is defined by the hyperparameter values for the candidate agent neural network.

12. The method of claim 11, wherein determining to train the candidate agent neural network on the candidate task only when a performance of the control policy as measured by the respective control policy returns is lower than a threshold level of performance that is defined by the hyperparameter values for the candidate agent neural network comprises:

determining to train the candidate agent neural network on the candidate task only when an average of the respective control policy returns is less than a fifth specified value, wherein:

the fifth specified value is a hyperparameter value for the candidate agent neural network.

13. The method of claim 1, further comprising:

after training each candidate agent neural network on a respective set of one or more tasks:

adjusting the hyperparameter values for one or more of the candidate agent neural networks in the population.

14. The method of claim 13, wherein the population of one or more candidate agent neural networks includes a plurality of neural networks and wherein adjusting the hyperparameter values for one or more of the candidate agent neural networks in the population comprises:

computing a respective fitness measure for each of the plurality of candidate agent neural networks that measures a respective performance of each of the plurality of candidate agent neural networks across a plurality of validation tasks; and applying a population-based training technique to the respective fitness measures to adjust the hyperparameter values for one or more of the candidate agent neural networks.

15. The method of claim 14, wherein the population-based trained technique also, for each of one or more of the candidate agent neural networks, sets the respective parameter values for the candidate agent neural network equal to the respective parameter values for another candidate agent neural network in the population data.

16. The method of claim 14, wherein computing the respective fitness measure comprises determining a respective normalized percentile metric for the candidate agent neural network on each of the plurality of validation tasks.

17. The method of claim 14, wherein applying the population-based training technique comprises:

determining that a respective fitness measure for a first candidate agent neural network Pareto dominates a respective fitness measure for a second candidate agent neural network; and in response, adjusting the hyperparameter values for the second candidate agent neural network to be equal to a mutated version of the hyperparameter values for the first candidate agent neural network.

18. The method of claim 1, wherein the training of each of the candidate agent neural networks on a respective set of one or more tasks occurs during a current training generation of a sequence of training generations during the training of the agent neural network, and wherein training the candidate agent neural network on the candidate task to update the parameter values of the parameters of the agent neural network comprises:

training the candidate agent neural network on the candidate task to optimize an expected return while distilling from a best performing candidate agent neural network in the population at the end of a preceding training generation that immediately precedes the current training generation in the sequence.

19. A system comprising:

one or more computers; and one or more storage devices communicatively coupled to the one or more computers, wherein the one or more storage devices store instructions that, when executed by the one or more computers, cause the one or more computers to perform operations for training an agent neural network for use in controlling an agent to perform a plurality of tasks, the operations comprising:

maintaining population data specifying a population of one or more candidate agent neural networks, the population data specifying, for each candidate agent neural network in the population, (i) respective parameter values of the parameters of the candidate agent neural network and (ii) respective hyperparameter values for training the candidate agent neural network; and training each candidate agent neural network on a respective set of one or more tasks to update the parameter values of the parameters of the candidate agent neural networks in the population data, the training comprising, for each candidate agent neural network:

obtaining data identifying a candidate task for training the candidate agent neural network;

obtaining data specifying a control policy for the candidate task;

determining whether to train the candidate agent neural network on the candidate task based on (i) a performance of the candidate agent neural network on the candidate task, (ii) a performance of the control policy for the candidate task on the candidate task and (iii) one or more of the hyperparameter values for the candidate agent neural network; and in response to determining to train the candidate agent neural network on the candidate task, training the candidate agent neural network on the candidate task to update the parameter values of the parameters of the agent neural network.

20. One or more non-transitory computer storage media storing instructions that when executed by one or more computers cause the one or more computers to perform operations for training an agent neural network for use in controlling an agent to perform a plurality of tasks, the operations comprising:

maintaining population data specifying a population of one or more candidate agent neural networks, the population data specifying, for each candidate agent neural network in the population, (i) respective parameter values of the parameters of the candidate agent neural network and (ii) respective hyperparameter values for training the candidate agent neural network; and training each candidate agent neural network on a respective set of one or more tasks to update the parameter values of the parameters of the candidate agent neural networks in the population data, the training comprising, for each candidate agent neural network:

obtaining data identifying a candidate task for training the candidate agent neural network;

obtaining data specifying a control policy for the candidate task;

determining whether to train the candidate agent neural network on the candidate task based on (i) a performance of the candidate agent neural network on the candidate task, (ii) a performance of the control policy for the candidate task on the candidate task and (iii) one or more of the hyperparameter values for the candidate agent neural network; and in response to determining to train the candidate agent neural network on the candidate task, training the candidate agent neural network on the candidate task to update the parameter values of the parameters of the agent neural network.

* * * * *